(12) United States Patent
Angermann et al.

(10) Patent No.: US 11,505,019 B2
(45) Date of Patent: Nov. 22, 2022

(54) SUPPORT ASSEMBLY OF A LOAD CARRIER OR A COUPLING DEVICE

(71) Applicant: WESTFALIA-AUTOMOTIVE GMBH, Rheda-Wiedenbruck (DE)

(72) Inventors: Kay Angermann, Dobeln (DE); Arne Kuhlen, Ennigerloh (DE); Sergei Stachurski, Rheda-Wiedenbruck (DE); Martin Wyrwich, Rheda-Wiedenbruck (DE)

(73) Assignee: WESTFALIA-AUTOMOTIVE GMBH

( * ) Notice: Subject to any disclaimer, the term of this patent is extended or adjusted under 35 U.S.C. 154(b) by 70 days.

(21) Appl. No.: 16/967,442

(22) PCT Filed: Feb. 20, 2019

(86) PCT No.: PCT/EP2019/054178
§ 371 (c)(1),
(2) Date: Aug. 5, 2020

(87) PCT Pub. No.: WO2019/166292
PCT Pub. Date: Sep. 6, 2019

(65) Prior Publication Data
US 2021/0213789 A1    Jul. 15, 2021

(30) Foreign Application Priority Data

Feb. 27, 2018  (DE) .................... 10 2018 104 490.9
Jun. 11, 2018  (DE) .................... 10 2018 113 909.8

(51) Int. Cl.
*B60D 1/48*  (2006.01)
*B60D 1/06*  (2006.01)

(52) U.S. Cl.
CPC ............ *B60D 1/485* (2013.01); *B60D 1/06* (2013.01)

(58) Field of Classification Search
CPC .................................................... B60D 1/455
See application file for complete search history.

(56) References Cited

U.S. PATENT DOCUMENTS 5,106,137 A    4/1992  Curtis
5,511,813 A    4/1996  Kravitz
(Continued)

FOREIGN PATENT DOCUMENTS

DE    7205182    10/1972
DE    7320517    11/1973
(Continued)

OTHER PUBLICATIONS

Patent Cooperation Treaty (PCT), International Search Report and Written Opinion for Application PCT/EP2019/054178 filed on Feb. 20, 2019, dated Aug. 13, 2019, International Searching Authority, EP.

*Primary Examiner* — Kevin Hurley
(74) *Attorney, Agent, or Firm* — McDonald Hopkins LLC

(57) ABSTRACT

A carrier arrangement for a rear end of a vehicle, forms a component of a load carrier which can be detachably fastened to the vehicle and projects in front of the rear end of the vehicle during use or forms a component of a coupling device that can be fastened to a rear end of a body of the vehicle, wherein, in the case of the load carrier (300), the carrier arrangement is provided for applying a load and comprises, in the case of the coupling device, a holder for a trailer coupling for attaching a trailer to the vehicle or for a load carrier coupling part for detachably coupling a load carrier to the vehicle. The carrier arrangement has at least one support profile which has a support profile circumferential wall with support profile circumferential wall sections arranged at an angle to each other and/or extend in a curved manner about the longitudinal axis of the support profile and delimit an interior space of the support profile with respect (Continued)

Figure 1:
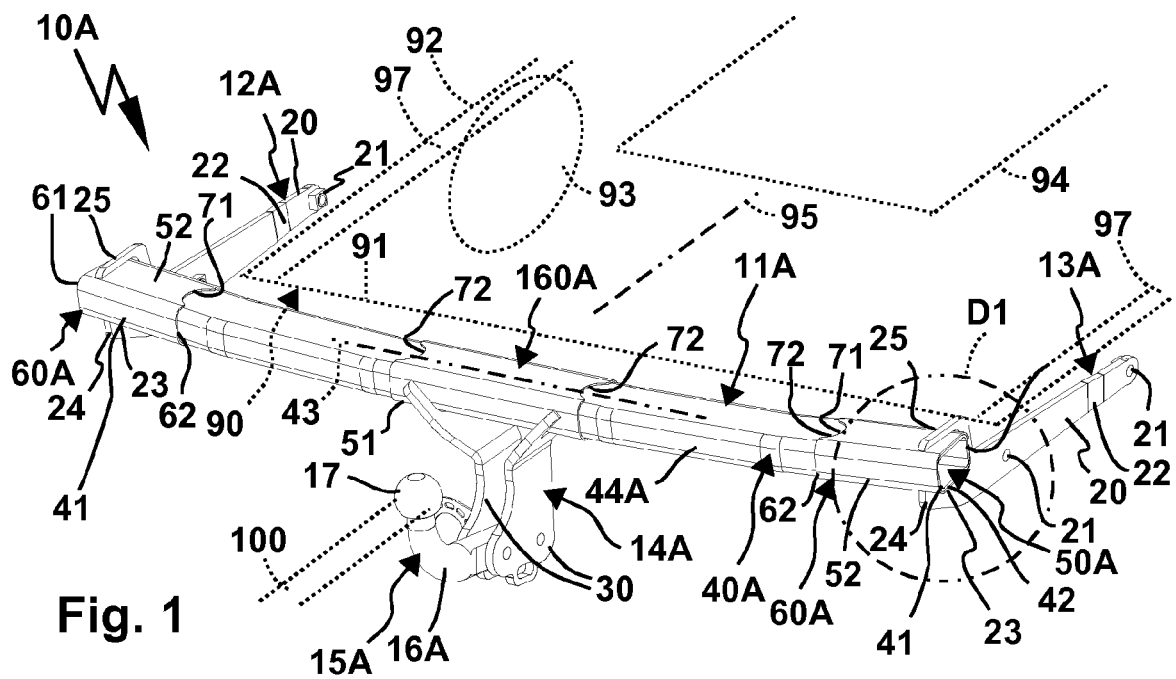

to the longitudinal axis on the circumference. The support profile is stiffened at least along a part of its longitudinal axis in a reinforcement section by a reinforcement profile which comprises reinforcement profile wall sections arranged at an angle to each other and/or extend in a curved manner about a reinforcement profile longitudinal axis of the reinforcement profile, and is supported on the support profile circumferential wall of the support profile in order to reinforce the support profile, wherein the at least one reinforcement profile engages into the interior space of the support profile or the support profile engages into a reinforcement profile interior space of the reinforcement profile which is delimited by the reinforcement profile wall sections in a circumferential angle range of more than 180° extending about the longitudinal axis of the support profile.

46 Claims, 14 Drawing Sheets

(56) References Cited

U.S. PATENT DOCUMENTS

| | | | |
|---|---|---|---|
| 8,272,663 B2 | 9/2012 | Farrell et al. | |
| 10,919,351 B1 * | 2/2021 | Corwin | B60D 1/56 |
| 2001/0017473 A1 | 8/2001 | Yamamoto | |
| 2004/0094975 A1 | 5/2004 | Shuler et al. | |
| 2017/0158151 A1 | 6/2017 | Palisse | |

FOREIGN PATENT DOCUMENTS

| | | | |
|---|---|---|---|
| DE | 29503365 | 5/1995 | |
| DE | 102008012622 | 9/2009 | |
| DE | 102010045104 | 3/2012 | |
| DE | 102012022613 | 5/2014 | |
| DE | 102012022614 | 5/2014 | |
| DE | 102013102140 | 5/2014 | |
| DE | 102013019736 A1 * | 5/2015 | B60D 1/485 |
| EP | 2495115 A1 * | 9/2012 | B60D 1/06 |
| EP | 2711209 | 3/2014 | |
| EP | 2803508 | 11/2014 | |
| EP | 3150409 | 4/2017 | |
| EP | 3150410 A1 * | 4/2017 | B60D 1/06 |
| GB | 2020240 | 11/1979 | |
| GB | 2372489 | 8/2002 | |
| NZ | 579770 | 9/2010 | |
| WO | 02062601 | 8/2002 | |

* cited by examiner

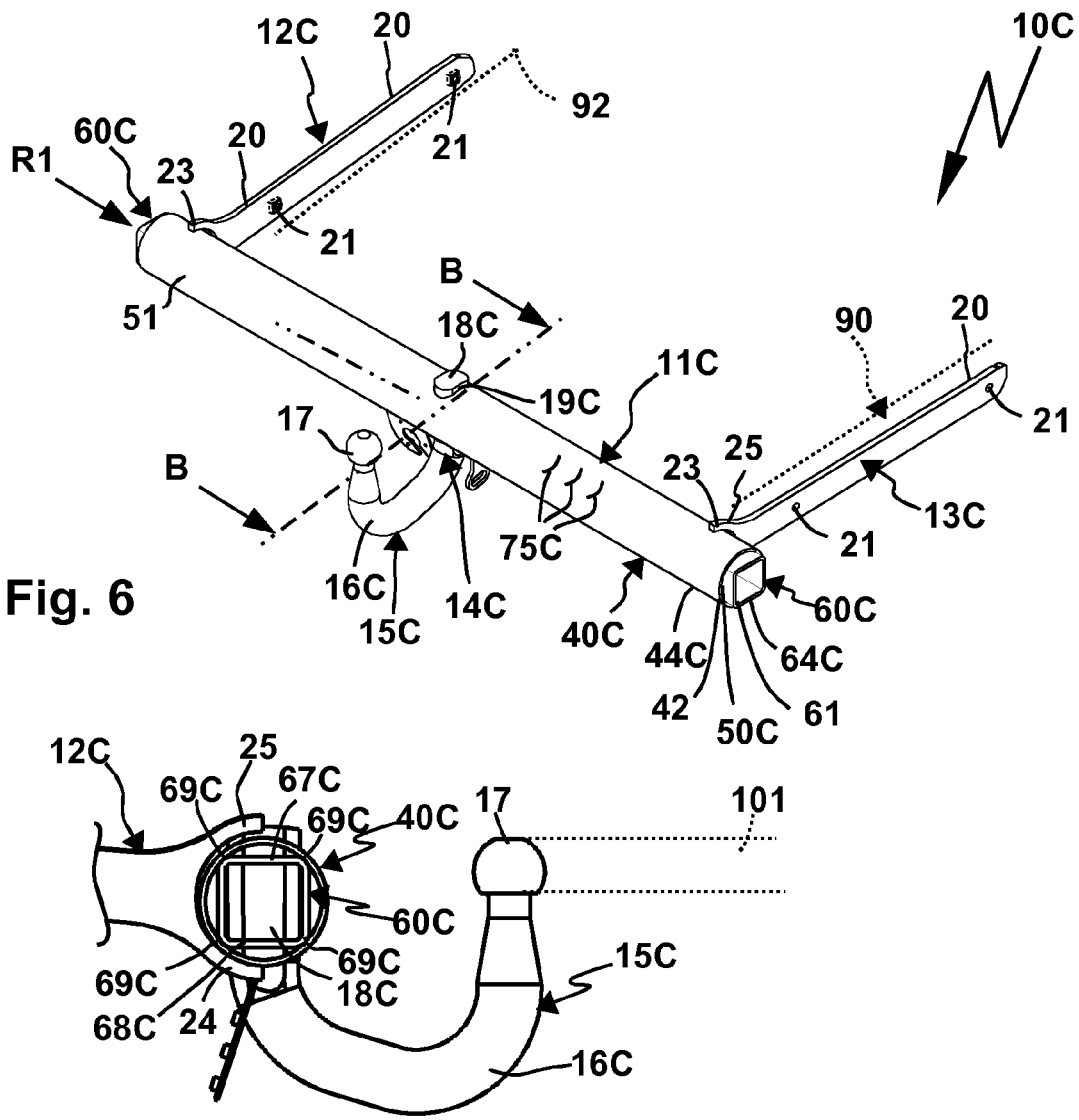
Fig. 6
Fig. 7
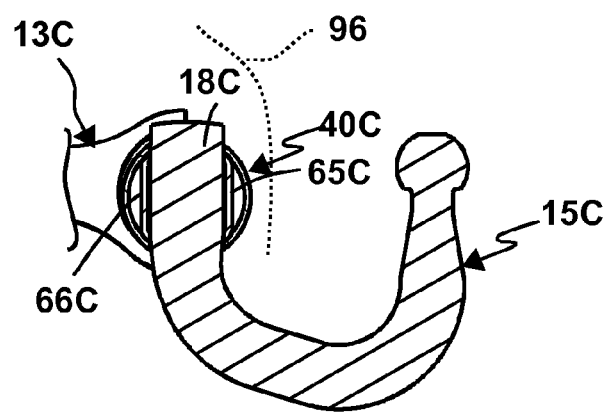
Fig. 8

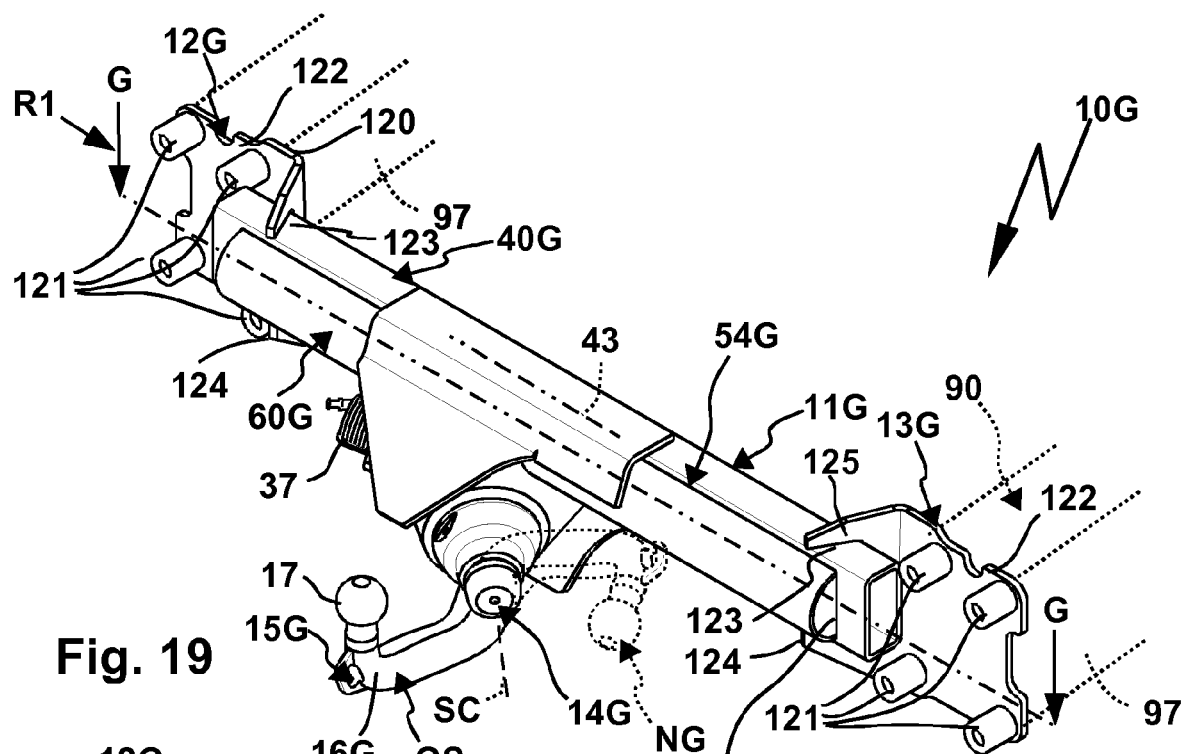
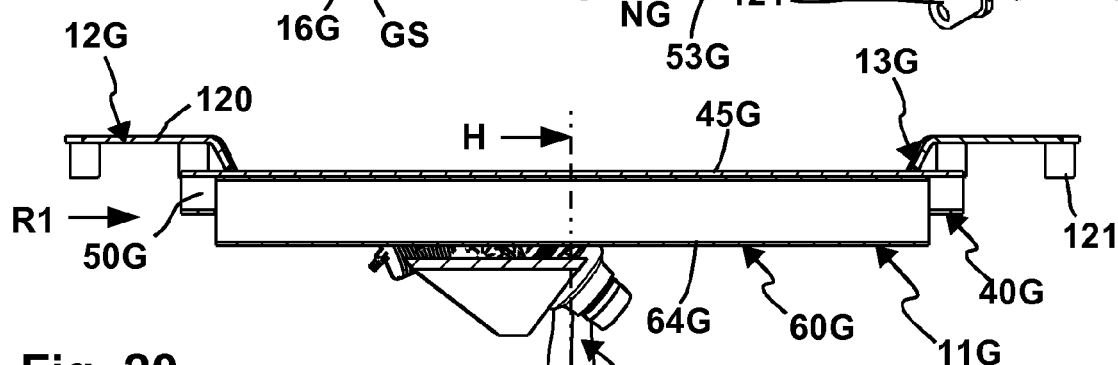
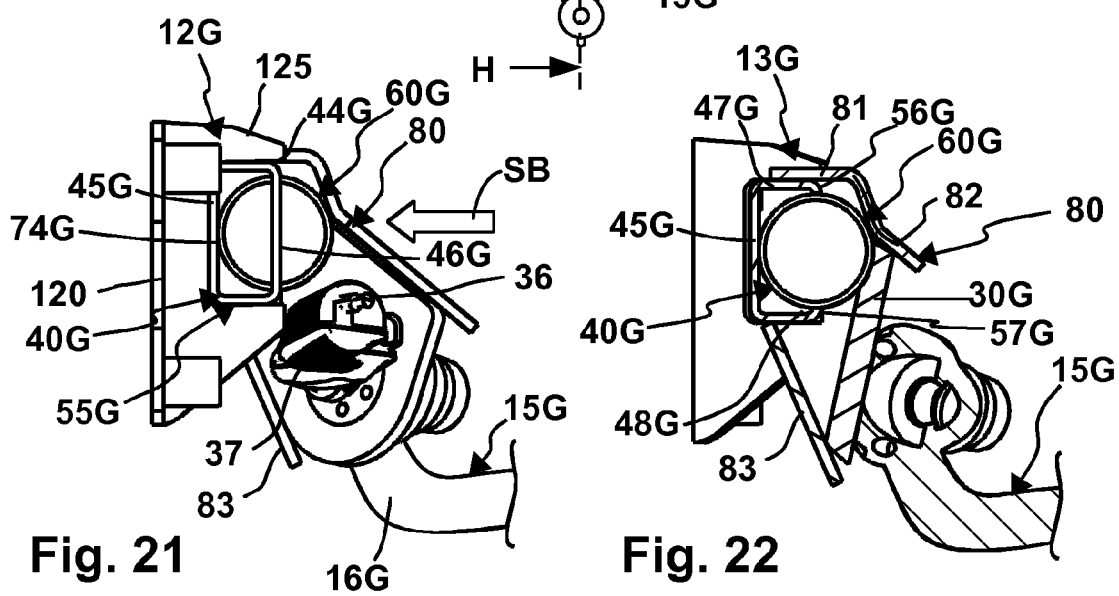
Fig. 19  Fig. 20  Fig. 21  Fig. 22

SUPPORT ASSEMBLY OF A LOAD CARRIER OR A COUPLING DEVICE

CROSS-REFERENCE TO RELATED APPLICATION

This application is a 35 U.S.C. § 371 national stage application of PCT Application No. PCT/EP2019/054178 filed on Feb. 20, 2019, entitled "CARRIER ARRANGEMENT OF A LOAD CARRIER OR A COUPLING DEVICE," which claims priority to German Patent Application No. 10 2018 104 490.9 filed on Feb. 27, 2018, and German Patent Application No. 10 2018 113 909.8 filed Jun. 11, 2018, each of which are incorporated herein in their entirety by reference.

The invention relates to a support assembly for a rear end of a vehicle, wherein the support assembly forms a component of a load carrier, releasably attachable to the vehicle, in particular projecting from the rear end of the vehicle in use, or forms a component of a coupling device mounted on or attachable to a rear end of a body of the vehicle, wherein the support assembly, in the case of the load carrier, is provided for the placing of a load, and in the case of the coupling device has a mounting for a trailer coupling for attaching a trailer to the vehicle or for a load carrier coupling part for releasable coupling of a load carrier to the vehicle, wherein the support assembly has at least one support profile which has a support profile peripheral wall with support profile peripheral wall sections at an angle to one another and/or running in a curve around the longitudinal axis of the support profile or profiles and bounding on the periphery an interior of the support profile with respect to the longitudinal axis.

Such a support assembly is for example in the form of a support frame, as described in DE 10 2011 122 285 A1. The load carrier extends for example to the rear beyond the rear end of the vehicle, for example a passenger car, and carries a bearing load, for example cycles or the like. The support assembly is for example in the form of a support frame with one or more support profiles, which are deformed under a heavy load, for example electric bikes.

The support assembly may also however, as described in DE 10 2016 111 174 A1, have a cross-member and/or side members, which are or may be fixed to a rear end of the vehicle. Fitted to the cross-member, for example, is a mounting for a coupling arm for coupling-on a trailer. The support assembly may have one support profile, but as a rule has several support profiles. In vehicle operation, the support profile or support profiles is or are heavily stressed, in particular in an accident situation. Thus for example the coupling arm, as a kind of lever, may exert forces on the cross-member, so that the latter undergoes a high torsional loading. The situation is even more problematic if the cross-member forms for example protection for a battery assembly, a tank or similar features of the vehicle.

It is therefore the problem of the present invention to provide a support assembly with at least one support profile which is able to withstand loading.

To solve the problem it is provided, for a support assembly of the type described above, that the support profile or profiles is or are reinforced in a reinforcing section, at least along a part of its or their longitudinal axis, by at least one reinforcing profile, which has reinforcing profile wall sections running at an angle to one another and/or curved around a reinforcing profile longitudinal axis of the reinforcing profile, and resting on the support profile peripheral wall of the support profile or profiles to reinforce the support profile, wherein the reinforcing profile or profiles engages or engage in the interior of the support profile or the support profile or profiles engages or engage in a reinforcing profile interior of the reinforcing profile which is bounded by the reinforcing profile wall sections in a peripheral angle range of more than 180° extending around the longitudinal axis of the support profile or profiles.

A basic concept of the present invention is that the support profile is strengthened and/or reinforced by the reinforcing profile. At the same time it is possible that the reinforcing profile as it were encloses or encases the support profile in the area of the reinforcing section. It is however also possible, in reverse, for the reinforcing profile to be wholly or partly accommodated in the interior of the support profile. The support profile and the reinforcing profile are advantageously held captive to one another along and/or across the longitudinal axis of the support profile or the reinforcing profile. It is advantageous for the support profile and the reinforcing profile to be held with resistance to shifting relative to the longitudinal axis of the support profile, for example by form-fitting and/or force-closing and/or by material bonding.

The support profile and the reinforcing profile are advantageously formed by basic bodies initially separate from one another, which are permanently connected. For example the support profile and the reinforcing profile are formed by profile parts initially separate from one another, which are joined together.

The vehicle is preferably a car, but may also be a truck, a van or the like. The vehicle may be an electric vehicle or a vehicle with a combustion engine, but also a hybrid vehicle with drives operable by two different power sources, for example en electric motor and a combustion engine.

The support profile and the reinforcing profile expediently have cross-sectional geometry differing from one another.

The support profile and the reinforcing profile are profile bodies initially separate from one another, which are fitted together by a production process.

It is possible that, on the support profile, several reinforcing profiles are arranged consecutively with regard to its longitudinal extent. Relative to the longitudinal axis of the support profile, the reinforcing profiles may overlap one another or be spaced apart.

In a longitudinal position relative to the longitudinal axis of the support profile it is possible to provide just one reinforcing profile or at least two or more reinforcing profiles. Thus for example in each case one reinforcing profile may be provided on a top and a bottom or a front and a rear of the support profile in the position of use.

It is also possible that a first reinforcing profile is provided in an interior of the support profile, and that the support profile engages in an interior of a second reinforcing profile. The first and second reinforcing profiles may be spaced apart longitudinally relative to the longitudinal axis of the support profile, but may also overlap one another or be provided at the same longitudinal position on the longitudinal axis.

Also possible is a nested configuration such that for example in the interior of the support profile there is located a first reinforcing profile which bounds an interior in which a further reinforcing profile is provided.

The support profile and/or the reinforcing profile are preferably tubular bodies or include tubular bodies, in particular in the area of the reinforcing section and/or adjacent to the reinforcing section. The reinforcing profile may be in the form of a sleeve in which the support profile engages. The support profile may however also form a locating tube for the reinforcing profile.

The interior of the support profile is advantageously bounded on the peripheral side completely or substantially completely by the support profile peripheral wall along at least one section of the longitudinal axis of the support profile.

It is advantageous if the reinforcing profile is held captive to the support profile with the aid of direct and screwless connection with the support profile and the support of the reinforcing profile on the support profile. The reinforcing profile is therefore held on the support profile without an additional holding body, for example form-fitting and/or by material bonding and/or force-closed. This is obtained for example by the shaping of the support profile and/or the reinforcing profile in the reinforcing section.

Preferably for example the reinforcing profile has an inner peripheral contour encompassing the support profile in respect of its longitudinal axis by more than 180° or more than half of the perimeter, or the support profile has an inner peripheral contour encompassing the reinforcing profile in respect of its longitudinal axis by more than 180° or more than half of the perimeter, so that the support profile and the reinforcing profile are joined to one another captive, in particular permanently, transversely to the longitudinal axis.

The reinforcing profile is advantageously a separate component from a connecting component for connecting the support profile to another component, in particular the mounting and/or another profile of the support assembly. The mounting, for example for the trailer coupling or the load carrier coupling part, is therefore separate from the reinforcing profile.

The support profile or the reinforcing profile or both are expediently designed as single-piece bodies. The support profile peripheral wall and/or the reinforcing profile wall sections are preferably in one piece or made from a single blank, for example by extrusion, forming or the like. It is however also possible that the support profile peripheral wall is made of several peripheral wall sections joined to one another by material bonding, for example welded together. The reinforcing profile wall sections may also be joined to one another by material bonding, for example by welding or the like.

Advantageously it is provided that the peripheral walls of the support profile and/or the wall sections of the reinforcing profile are completely closed around the longitudinal axis and/or annularly in the reinforcing section. Therefore a closed peripheral wall of the support profile or a closed wall which in this case also forms a peripheral wall of the reinforcing profile are advantageous. The reinforcing profile wall sections or the peripheral wall of the support profile advantageously form an annular closed peripheral wall around the longitudinal axis of the support profile or the reinforcing profile.

An advantageous concept provides for the support profile to have next to the reinforcing section at least one section in which the support profile peripheral wall is closed completely around the longitudinal axis and/or is closed annularly. It is therefore possible for the support profile to have a closed section in which the support profile peripheral wall is as it were closed. It is possible that the support profile peripheral wall has a side opening in the closed section, i.e. that the support profile is for example U-shaped. With regard to the longitudinal axis, next to the closed peripheral wall again the reinforcing section is provided, where the peripheral wall of the support profile may have openings, recesses or the like, which will become clearer.

It may be provided that the reinforcing profile and/or support profile have in particular in the area of the reinforcing section a round cross-section and/or a polygonal cross-section, in particular a rectangular or square cross-section. Thus, any desired cross-sections are possible for the reinforcing profile or the support profile, for example substantially polygonal cross-sections in which the edge areas may be angular or rounded. However, round, in particular circular, oval or elliptical cross-sections are also possible for the support profile and the reinforcing profile.

A reinforcing profile or support profile with a polygonal cross-section may be arranged in various angular positions relative to its longitudinal axis. Thus it is for example possible for wall sections, for example peripheral wall sections of the support profile or side wall sections of the reinforcing profile to run roughly horizontally in the position of use but also be able to run at an angle to the horizontal. It is also possible that edge areas of the support profile or the reinforcing profile are so oriented that the relevant profile as it were stands on the edge. From the edge area, for example, side walls of the profile may extend at an angle downwards or at an angle upwards.

It is advantageous if at least one reinforcing profile wall section lies flat against the peripheral wall of the support profile. So, for example, the support profile and the reinforcing profile may have plane wall sections which lie flat against one another, so that one profile rests on the other profile. It is also possible that for example round wall sections, i.e. wall sections which have curves running transversely to the longitudinal axis, of the support profile and the reinforcing profile, lie flat against one another. The wall sections lying flat against one another may be joined together, for example joined integrally to one another, but also in loose contact with one another.

Preferably it is provided that the reinforcing profile is held completely in the interior of the support profile and does not extend beyond the peripheral wall of the support profile. Consequently for example the volume or the outer contour of the support profile is not increased by the reinforcing profile. Instead, the reinforcing profile fits as it were exactly in the interior of the support profile.

It is possible that the reinforcing profile in the reinforcing section protrudes from an outer peripheral contour of the support profile on at least one side, in particular on opposite sides. It is for example possible that the reinforcing profile extends to the rear beyond the support profile in the vehicle longitudinal direction or relative to the longitudinal axis of the vehicle. The reinforcing profile may however also for example extend forwards in front of the support profile, upwards or downwards or in the vehicle longitudinal direction or relative to the vehicle longitudinal axis. A part of the reinforcing profile is however held in the interior of the support profile.

It may be provided that, in the case of a component of the support profile or the reinforcing profile there is a recess in which the other component of the support profile or reinforcing profile engages. The recess runs expediently parallel to the longitudinal axis or inclined in a flat angle, for example a maximum of 5° or a maximum of 3° to the longitudinal axis of the support profile. Thus for example the support profile peripheral wall may be provided with a recess in which the reinforcing profile is held completely or partly. At the same time it is possible that the reinforcing profile extends beyond the outer peripheral contour of the support profile transversely to the longitudinal axis or cross-sectional contour of the support profile. It is however also possible for the reinforcing profile to dip completely into the recess of the support profile, so that for example a side wall of the reinforcing profile does not extend beyond an outer peripheral contour or cross-sectional contour of the support profile, or even stands back from it, so that a recess is formed.

An advantageous concept provides that the reinforcing profile extends parallel or substantially parallel to the longitudinal axis of the support profile next to at least one tie section of the support profile, in particular being arranged between two such tie sections. For example the tie sections may form as it were an upper tie and/or a lower tie in a typical position of use of the support assembly. The reinforcing profile is preferably joined by form-fitting and/or material bonding to the tie section or tie sections and/or rests on the tie section or tie sections.

In itself it is possible that such a tie section is formed for example by a plane wall surface, from which no side leg extends. It is preferred for the tie section or tie sections to have at least two support profile peripheral wall sections arranged transversely to the longitudinal axis, at an angle to one another and/or curved, in particular U-shaped, L-shaped or V-shaped and extending along the longitudinal axis. Such a tie section is stiffer than a purely plane wall surface.

It is true that it was explained initially that the reinforcing profile expediently represents a closed profile or is formed by a profile closed on the peripheral side. It is e.g. possible that the reinforcing profile wall sections form a peripheral wall or form parts of a peripheral wall of the reinforcing profile.

It is however also possible that the reinforcing profile has a base leg and at least one side leg sticking out from it.

It is preferred if the reinforcing profile has a C-shaped, U-shaped, V-shaped, E-shaped, W-shaped, T-shaped or L-shaped cross-section.

It may be advantageously provided that a base leg of the reinforcing profile is arranged outside the interior of the support profile, and at least one leg of the reinforcing profile extending away from the base leg, in particular all legs extending away from the base leg, engages or engage in the interior of the support profile. In principle however it is also possible that the reinforcing profile, if it has a base leg and at least one side leg extending away from the former, is located completely in the interior of the support profile, i.e. that the base leg too is mounted in the interior of the support profile.

The base leg of the reinforcing profile arranged outside the support profile may be at a distance from the support profile. An elastic material, air or the like may be provided in the space created. It is preferred, though, for the base leg to rest on the peripheral wall of the support profile and/or be joined to the peripheral wall of the support profile by material bonding and/or form-fitting. The base leg is thus able to reinforce the peripheral wall directly.

Geometrical concepts are set out below.

It is preferred that, in the position of use of the support assembly, a vertical extent in height of the support profile transversely its longitudinal axis is greater than a vertical extent of the reinforcing profile and/or a distance between upper and lower support profile peripheral wall sections of the support profile is greater than a distance between upper and lower reinforcing profile walls. Hence, the support profile in the position of use is therefore for example vertically higher than the reinforcing profile. At the same time it is possible that the support profile in the position of use is also wider, i.e. wider in the horizontal direction, than the reinforcing profile. The following configuration is however also advantageous:

Preferably it is provided that, in the position of use of the support assembly, a horizontal extent in depth of the support profile transversely to its longitudinal axis is less than a horizontal extent in depth of the reinforcing profile and/or a distance between support profile peripheral wall sections of the support profile which are horizontally furthest removed from one another is less than a distance between reinforcing profile walls horizontally furthest removed from one another. Thus, the support profile is horizontally narrower than the reinforcing profile.

The support profile and the reinforcing profile may for example have a flat shape, wherein the peripheral wall of the support profile has narrow sides running above and below, while the reinforcing profile has between its top and bottom wall sections, side wall sections which are narrower than these top and bottom wall sections.

The support profile and the reinforcing profile may have transversely to the longitudinal axis an outer peripheral contour which is for example L-shaped, T-shaped or cross-shaped. At least one leg of such an outer peripheral contour is formed by the support profile and at least one leg of the outer peripheral contour by the reinforcing profile.

It is possible that the reinforcing section extends to a longitudinal end of the support profile. It is however also possible that at least one longitudinal end, in particular both longitudinal ends of the support profile are not reinforced by the reinforcing profile. Here it is possible that the reinforcing profile does extend up to the respective longitudinal end section of the support profile, but not to the longitudinal end. At the longitudinal end section of the support profile reinforced by the reinforcing profile, the support profile is connected to another body, for example a side member of the support assembly.

It may be provided that the support profile is reinforced by the reinforcing profile over substantially its entire length. It is however also possible that the support profile is reinforced by the reinforcing profile over only part of its length. Thus for example only a central section, relative to the longitudinal extent of the support profile, may be reinforced by the reinforcing profile, while the longitudinal end sections are not reinforced by a reinforcing profile arranged according to the invention or are reinforced by other means. It is however also possible that for example the longitudinal end sections of the support profile are in each case reinforced by one reinforcing profile or by several reinforcing profiles, while the central section of the support profile is not reinforced or is reinforced by other means.

It is however advantageous if a central section of the support profile extending between longitudinal end sections of the support profile is reinforced by the reinforcing profile or by a reinforcing profile.

It is also expedient if the reinforcing section is located in the area of the mounting for the trailer coupling or the load carrier coupling part.

Advantageously it is provided that the support profile is reinforced by the reinforcing profile in the area of its connection with a further component of the support assembly, in particular a side member for connection with the vehicle and/or the mounting for the trailer coupling or the load carrier coupling part and/or another profile. Thus for example a transmission of force on the side member by a cross-member formed by the support profile according to the invention may be improved, if the support profile is reinforced by the reinforcing profile in the area of the side member.

In respect of materials, there are numerous degrees of freedom. Thus it may be provided that the support profile and the reinforcing profile are made of the same material or of different materials. For example the reinforcing profile is made of a higher-strength material, for example a higher-strength steel, than the support profile. The support profile or the reinforcing profile or both may be made of metal, for example steel, aluminium or the like, or of plastic, for example fibre-reinforced plastic or the like. Also readily possible is a material mix with for example the support profile being made of metal, while the reinforcing profile is made of plastic (or vice-versa), or for different metals of different steels to be used for support profile and reinforcing profile. It is also possible for the support profile and/or the reinforcing profile to be made of material composites or material combinations, for example a composite involving plastic and metal. The support profile and/or the reinforcing profile may however also be made of hybrid materials and/or sandwich materials. These hybrid materials or sandwich materials may for example be combinations of different metals with different metal layers, combinations of metal and plastic or the like, Suitable for joining the support profile and the reinforcing profile are various connection methods, separately and in combination. So it may be provided advantageously for the reinforcing profile to be joined to the support profile by form-fitting and/or force-fitting, in particular in a press fit, and/or by material bonding, in particular by a welded joint and/or an adhesive bond and/or a soldered connection. Suitable for a welded joint are for example spot welding, hole welding, edge welding or the like.

A form-fitting connection between support profile and reinforcing profile may be obtained for example by providing that the reinforcing profile or the support profile has recesses running transversely to the longitudinal axis, in particular notches or cut-outs, in which there engage holding projections, in particular produced by deformation and running transversely to the longitudinal axis, of the respective other profile, the support profile or the reinforcing profile. The recesses are preferably, like the holding projections, arranged side-by-side in a row arrangement. It is in particular advantageous when such recesses are provided on a longitudinal edge area of the respective profile. While it is advantageous for several such recesses and holding projections to be provided, it goes without saying that just a single such recess and a holding projection engaging in it are also possible. The recess or recesses and the holding projection or projections engaging in the former may have for example a round inner peripheral contour or outer peripheral contour. It is however also possible for the holding projection and the recess to have polygonal, for example rectangular or triangular outer peripheral contours and/or inner peripheral contours.

The reinforcing profile and the support profile may firstly be fitted to one another before forming takes place. Thus it may be provided that the reinforcing profile and the support profile are form-fitted to one another with the aid of forming of at least one of the profiles which is carried out with the profiles fitted together. For example it is possible that the outer profile is formed in the direction of the inner profile, for example obtaining a kind of impression or indentation or bulge, which then abuts or penetrates the inner profile. The forming is provided preferably on a side wall, away from an edge area of the respective profile.

It is expedient if the reinforcing profile is joined to the support profile with the aid of internal high-pressure forming, in particular hydroforming, and/or curvature deformation. In the case of curvature deformation, the profiles fitted together are deformed together, so that the profiles have a curved shape or in each case two legs at an angle to one another. For example the support profile is in this way adapted to an outer peripheral contour of the vehicle. Thus for example by means of such curvature deformation, side member sections protruding at an angle from a cross-member section of the support profile may be shaped for fitting to the vehicle.

Spaces may be provided between the reinforcing profile and the support profile. Such a space may be a hollow space. It is advantageous if at least one space between the reinforcing profile and the support profile and/or at least one interior space of the reinforcing profile or the support profile is filled with a foam-like material and/or elastic material. The foam-like material or elastic material may for example have a damping effect during an impact loading, in particular an accident. Such filling of the space is also suitable for avoiding vibrations, disagreeable noises or the like. The foam material may comprise an open-pore or closed-pore foam.

In itself it is sufficient if the support profile and the reinforcing profile are held together transversely to the longitudinal axis of the support profile with the aid of their profile shape, a form-fitting or force-closed or material bonding connection or the like. It is however also possible that the support profile and the reinforcing profile are held together with the aid of at least one holding body separate from the support profile and the reinforcing profile. The holding body may, for example in the case of an impact loading or a crash, provide additional support of the reinforcing profile on the support profile, for example prevent or avoid deformation of the reinforcing profile away from the support profile.

It may be provided for the holding body to be connected to the mounting for the trailer coupling or the load carrier coupling part, or to be formed by the mounting. The mounting may therefore contribute to the fixing of the reinforcing profile to the support profile.

The holding body may for example be plate-like. A type of housing concept is preferred. The holding body may at least partly encase the arrangement of support profile and reinforcing profile in the reinforcing section or may form a housing.

It is also possible for the holding body to comprise a clip, which clamps together at least one of the support profile or the reinforcing profile. The retaining clip may clamp legs of the support profile together and at the same time fix the reinforcing profile relative to the support profile. It is possible that clip legs of the retaining clip run transversely to the longitudinal axis of the support profile or of a support profile section, in particular engaging in the support profile or the reinforcing profile. The clip legs of the clip may for example penetrate from an outside of the support profile into the interior of the support profile and fix the reinforcing profile located there relative to the support profile.

Suitable for form-fitting fixing of the reinforcing profile to the support profile are for example plug-in projections and plug-in locations. Preferably it is provided that the support profile and the reinforcing profile are positively joined to one another by at least one pair of a plug-in location and a plug-in projection. The plug-in projection engages in the plug-in location or locations. The insertion axis for plugging together of the plug-in projection and the plug-in location runs preferably transversely, in particular at a right-angle to, the longitudinal axis of the support profile or the reinforcing profile. Thus it is for example provided that the support profile has at least one plug-in location, in which a plug-in projection of the reinforcing profile engages. It is however also possible that the plug-in projection is provided on the support profile and engages in the plug-in location provided on the reinforcing profile. Moreover, the reinforcing profile and the support profile may have plug-in projections and plug-in locations.

The plug-in projection may without any further connection measures be inserted only with form-fitting in the plug-in location. It is preferred however if the plug-in projection fitted in the plug-in location is joined by material bonding with the support profile, in particular by welding. For example, the plug-in projection may protrude from the plug-in location, or be flush or recessed relative to the plug-in location or be held with material bonding next to the plug-in location by a weld seam. But bonding of the plug-in projection in the plug-in location is also possible. It is also possible for the plug-in projection to be impressed or pressed into the plug-in location and/or for a section of the plug-in projection protruding from the plug-in location to be formed transversely to an insertion axis, along which the plug-in projection is plugged into the plug-in location.

It is possible that the reinforcing profile is supported on the support profile only with the aid of one or more pairings of plug-in projection and plug-in location, in particular if a material bonding connection is also implemented. It is preferred, however, if the reinforcing profile rests on the support profile, in particular on an inner side of the peripheral wall facing the interior of the support profile, next to the plug-in projection. The pairing of plug-in projection and plug-in location may for example realise a fixing of support profile and reinforcing profile relative to the longitudinal axis of the support profile, while the support alongside the pairing of plug-in projection and plug-in location is especially resilient, for example in the event of impact loading, an accident or the like.

Preferably it is provided that the reinforcing profile or the support profile have a row arrangement in an array line, in particular straight, of plug-in projections arranged side-by-side, which engage in an elongated plug-in location running along the array line or in plug-in locations provided in a row arrangement along the array line, wherein the plug-in location or plug-in locations are provided on the respective other of reinforcing profile and support profile. The array line runs for example parallel to the longitudinal axis of the support profile or the reinforcing profile. For example the plug-in projections are provided on the reinforcing profile, in particular an end face of a side leg of the reinforcing profile, while the plug-in location or plug-in locations are provided on the support profile. It is however possible, in reverse, for the reinforcing profile to have plug-in locations or one plug-in location in which the plug-in projections, which are provided in a row arrangement on the support profile, engage. Naturally, a material bonding connection of the plug-in projections with the plug-in location or plug-in locations is possible.

Support of the profiles against one another between the plug-in projections is advantageous. Expediently it is provided that the reinforcing profile rests on the support profile between the plug-in projections, in particular on an inner side of the peripheral wall facing the interior of the support profile.

In an advantageous concept it is provided that at least one end face of the reinforcing profile has, relative to the longitudinal axis of the support profile, an inclined course and/or a curvature to reduce notch stress between the support profile and the reinforcing profile. Thus for example a smoothing, an end face of the reinforcing profile running at an angle but straight, may be provided. In the area of the end face, the reinforcing profile is joined to the support profile preferably by material bonding, for example welding, soldering or bonding, and/or form-fitting.

Relative to the longitudinal axis of the support profile, the reinforcing profile may have sections protruding from a base body of the reinforcing profile. Such protruding sections are provided in particular at an edge area of the reinforcing profile. From the protruding sections of the reinforcing profile, an end face of the reinforcing profile runs, relative to the longitudinal axis of the support profile, to the base body of the reinforcing profile, in particular at an angle or curved. This measure contributes towards reducing or avoiding notch stress between the support profile and the reinforcing profile.

The reinforcing profile provides for greater resilience of the support profile in the event of stress due to an accident or impact loading. Especially advantageous in this connection is the following measure in which it is provided that the reinforcing profile and the support profile in at least one area are at a distance from one another in which deformation of the reinforcing profile and/or the support profile is reduced under impact loading, in particular due to an accident. The distance may be a hollow space containing for example air. It is also possible for the space to contain a resilient filling material, for example foam, an elastic material, rubber or the like.

The reinforcing profile may however also as it were be designed or provided as an active crash element. An advantageous measure provides that the reinforcing profile is supported on the support profile by wedging, in the event of an impact loading, in particular caused by an accident. Thus the reinforcing profile may for example have legs or side wall sections which, due to a pressure load or impact loading are as it were moved away from one another and only in this way rest on the support profile, or rest on the support profile to an increased extent.

The support profile and/or the reinforcing profile have an elongated shape. A respective length of the support profile or reinforcing profile is at the same time at least twice as large, preferably at least three times, four times, five times, eight times or ten times as large as the respective diameter of the support profile or the reinforcing profile.

The reinforcing profile is preferably provided, with the support profile fitted to the vehicle, on a side facing away from the rear section of the vehicle, in particular on a peripheral wall side of the support profile provided there. This applies in particular to a base leg or a base wall of the reinforcing profile. Side legs of the reinforcing profile, which protrude from the base leg or the base wall, extend expediently towards the rear section of the vehicle. It is also advantageous if a base wall or base leg of the support profile is vertical or substantially vertical in the position of use.

The reinforcing profile forms an essentially free-standing reinforcing structure, i.e. it is advantageous if it is not used for the connection of two part sections, for example part sections of the support profile at an angle to one another or arranged consecutive to one another in the longitudinal direction. It is also advantageous when the reinforcing profile is not provided or arranged for connecting a cross-member to a side member of the support assembly.

It is therefore provided advantageously that the reinforcing profile is used solely for the purpose of reinforcing the support profile.

It is preferred if the reinforcing profile does not protrude from an upper side in the position of use and/or not from a bottom side of the support profile in the position of use.

The support assembly may form part of a support frame of a load carrier.

Preferred however is the use of the support assembly as a support construction for a coupling device. It is preferred if provision is made for the support assembly that it has cross-members, extending in the position of use transversely to a vehicle axial direction or vehicle longitudinal axis of the vehicle, which have longitudinal end sections held on side members of the support assembly provided for connection to the vehicle. The side members may be for example be holding brackets for fastening to longitudinal members of the vehicle. The side members may however also be elongated side members extending in the axial direction of the vehicle, for example fastened or able to be fastened to the body of the motor vehicle.

The cross-member and/or the side members may be as it were conventional components, for example support profiles not reinforced by a reinforcing profile. It is preferred, however when the cross-members and/or the side members have or are formed by the support profile reinforced by the reinforcing profile. At the same time it is possible that only the cross-member has such a reinforcing profile, while the side members are not reinforced.

It is especially advantageous if a reinforcing profile is used in a connection zone or transition zone between the cross-member and one or both of the side members. The connection zone may bent or curved or provided around the corner. It is however also possible that the cross-member has in the connection zone a straight course in particular along its longitudinal axis.

Advantageously the support profile protrudes from opposite longitudinal ends of the reinforcing profile.

Expediently the reinforcing profile serves solely for reinforcing the support profile and/or has no function of connecting the support profile to another component.

The reinforcing profile is advantageously a separate component from a component, in particular a side member, provided for connection of the support assembly to the vehicle. It is also advantageous if the reinforcing profile is a separate component from the mounting for a trailer coupling or a load carrier coupling part.

The trailer coupling includes for example a coupling arm, on the free end section of which facing away from the mounting there is provided a coupling element, in particular a coupling ball. The mounting may for example have a plug-in location for the trailer coupling or the load carrier coupling part.

Figure 2:
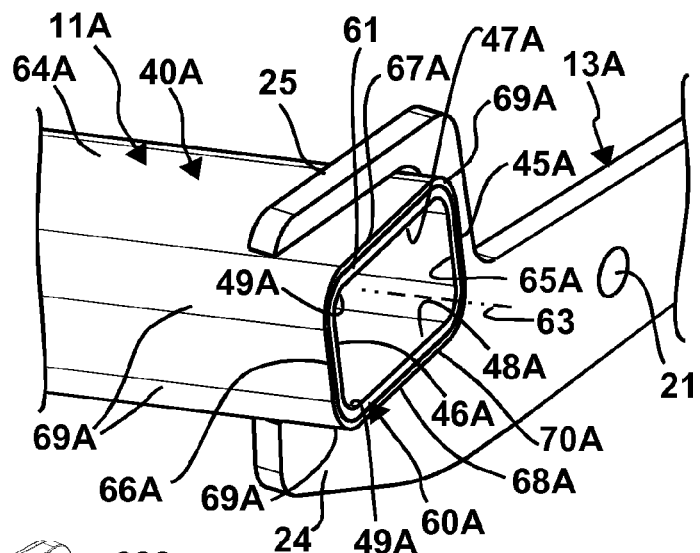

It is possible that the trailer coupling or the load carrier coupling part is fitted to the mounting so as to be non-releasable or captive, but still movable, for example able to swivel or shift. Thus the trailer coupling, for example its coupling arm, may be mounted by the mounting, movable relative to the vehicle, between a position of use for attaching the trailer or putting on a load carrier, and an inoperative position. In the position of use, the trailer coupling or the load carrier coupling part extend rearwards beyond the rear section, for example a bumper, of the vehicle, viewed in the direction of travel, and in the inoperative position they are shifted towards the rear section, for example concealed behind a bumper of the vehicle Embodiments of the invention are explained below with the aid of the drawing, which shows in:

FIG. 1 a perspective oblique view of a support assembly carrying a trailer coupling with a reinforcing profile supporting a support profile on the outside FIG. 2 a detail D1 of FIG. 1

Figure 3:
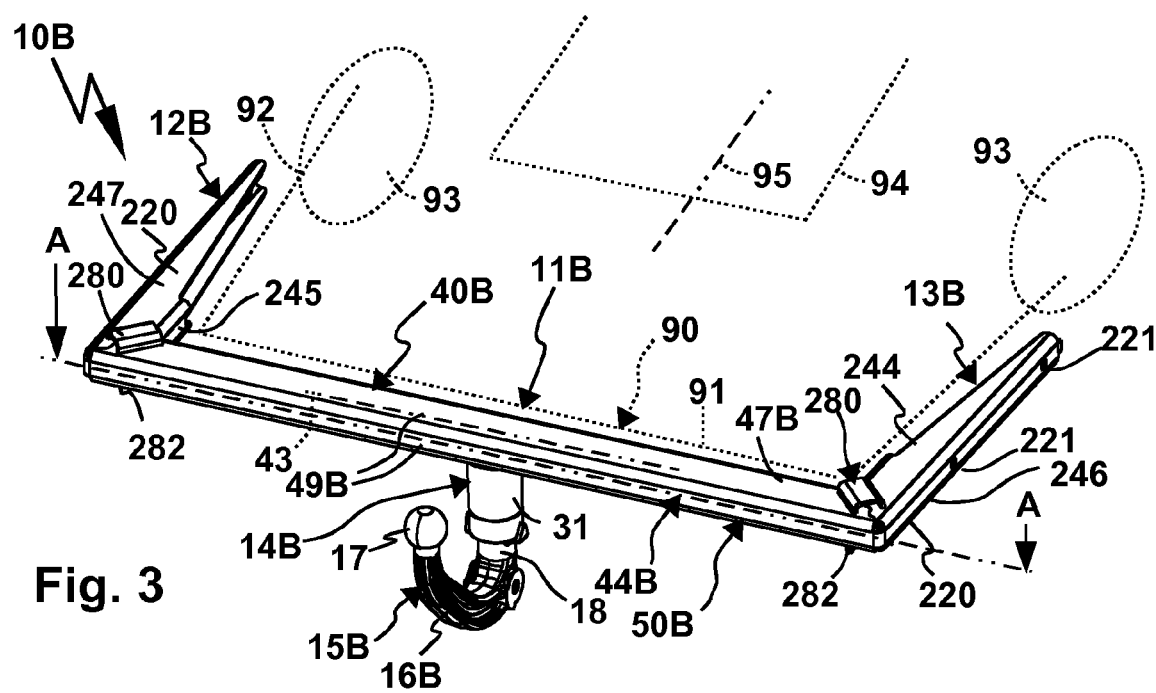
Figure 4:
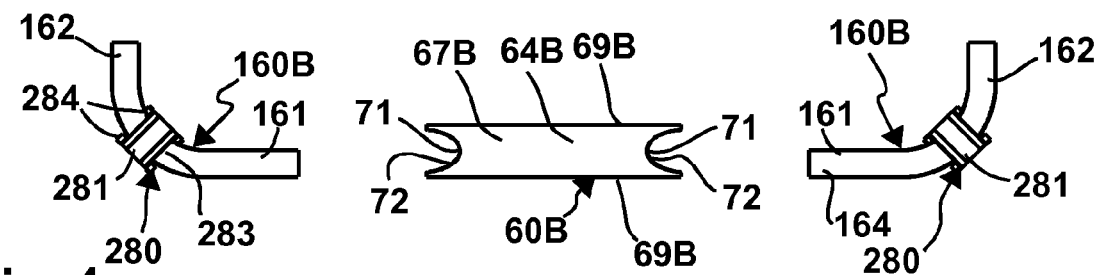

FIG. 3 a perspective oblique view of a support assembly with corner areas reinforced by reinforcing profiles FIG. 4 a plan view of the reinforcing profiles of the support assembly according to FIG. 3

Figure 5:
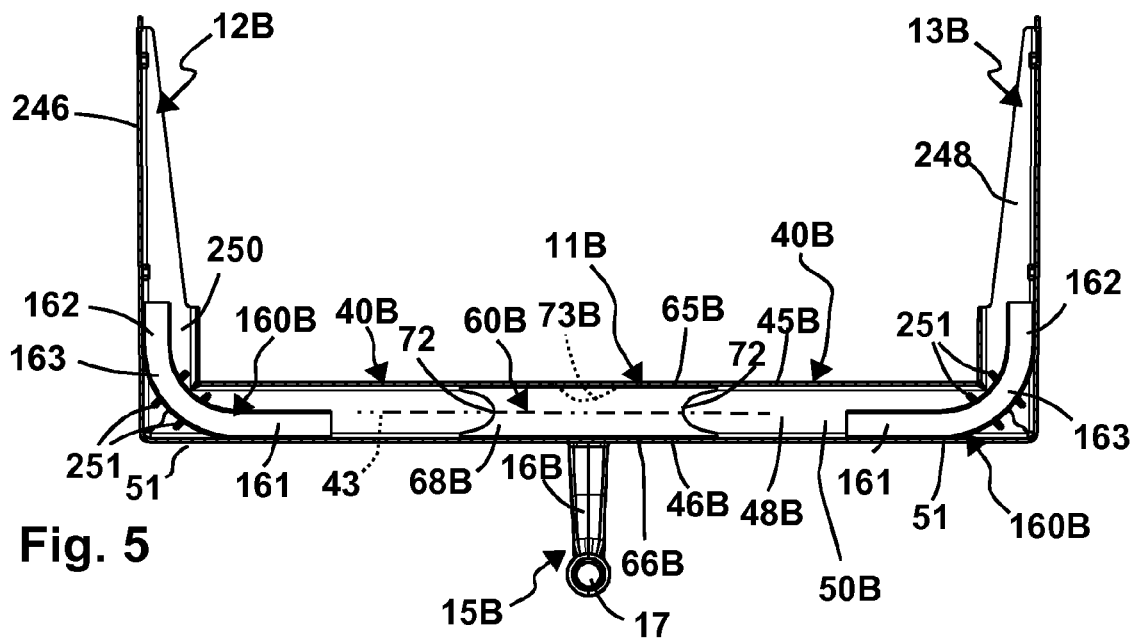

FIG. 5 a cross-sectional view of the support assembly according to FIG. 3, roughly along a section line A-A in FIG. 3

FIG. 6 a perspective oblique view of a support assembly of a trailer coupling with a support profile, round in cross-section, in which a rectangular reinforcing profile is held FIG. 7 a side view of a front part of the support assembly according to FIG. 6, roughly in the direction of view R1

Figure 9:
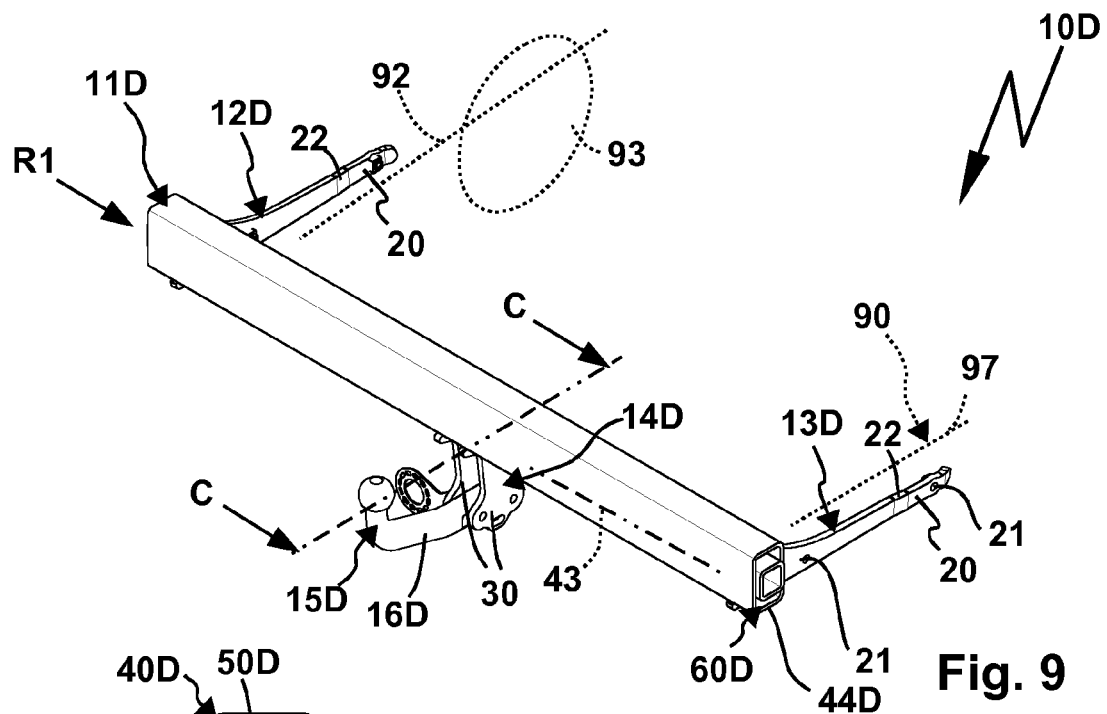
Figure 10:
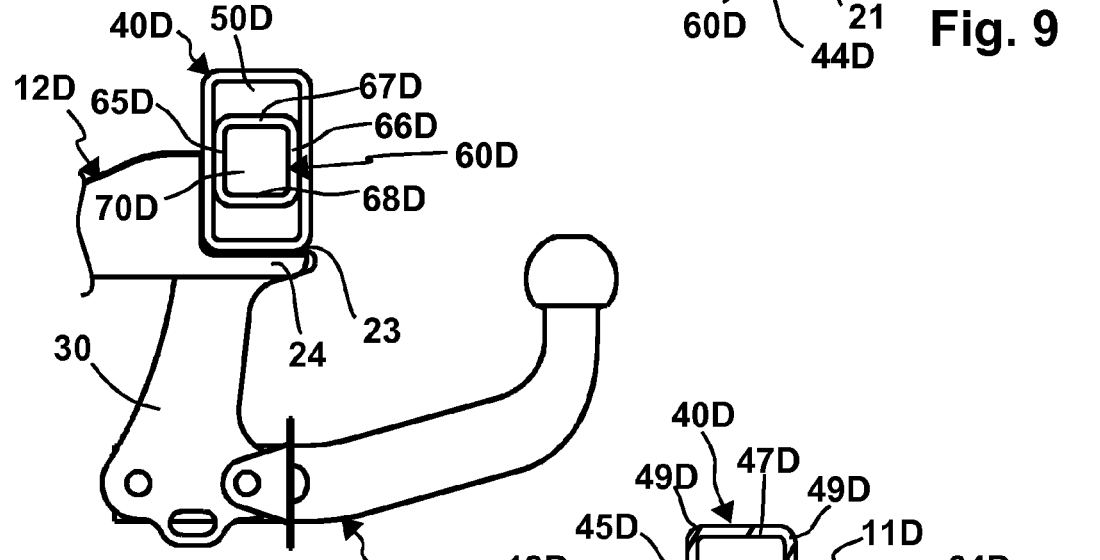

FIG. 8 a cross-section through the support assembly according to FIG. 6, roughly along a section line B-B FIG. 9 a perspective oblique view of a support assembly of a trailer coupling with a support profile, rectangular in cross-section, in which a further support profile, rectangular in cross-section is held FIG. 10 a side view of a front part of the support assembly according to FIG. 9, roughly in the direction of view R1

Figure 11:
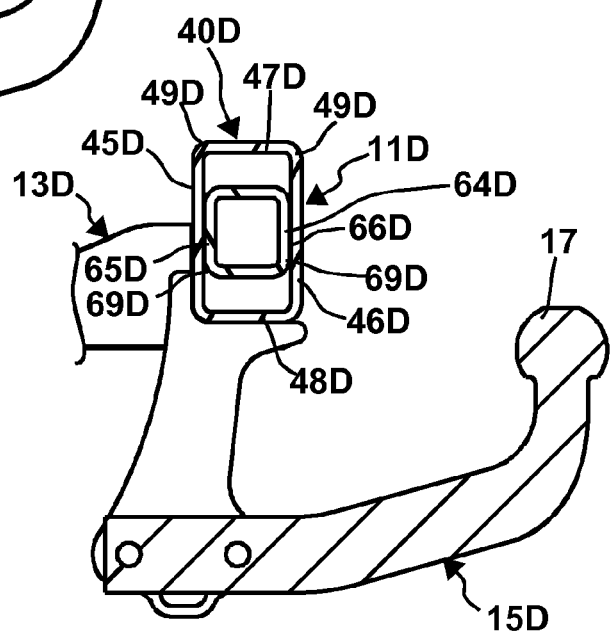
Figure 12:
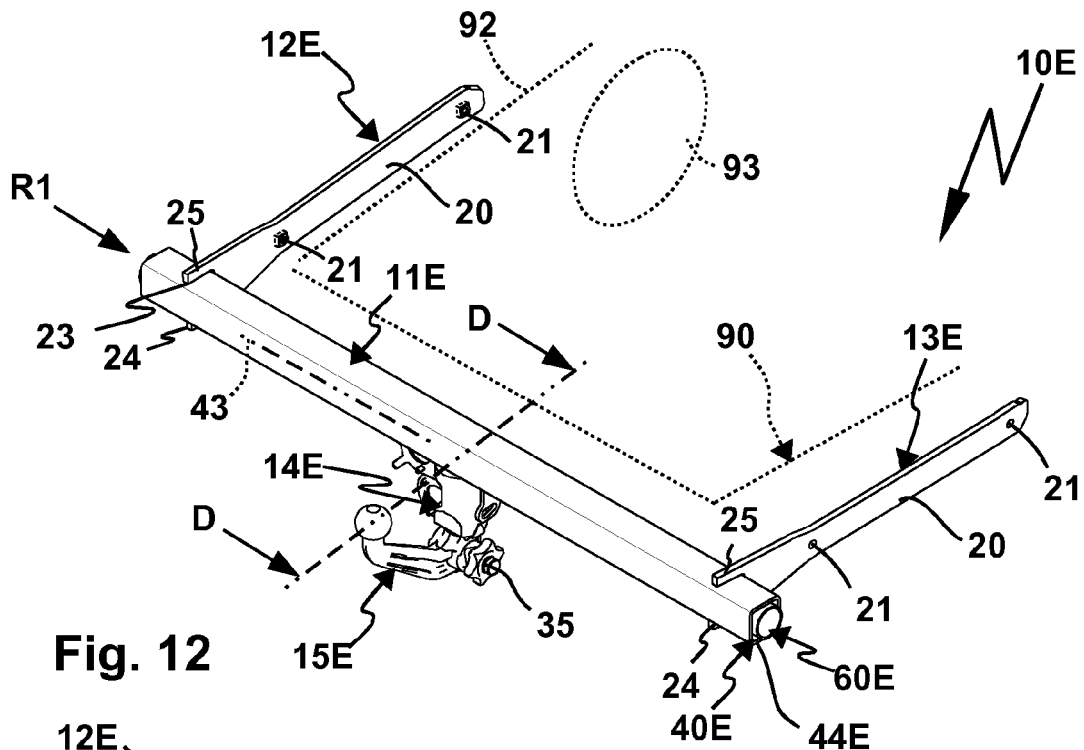
Figure 13:
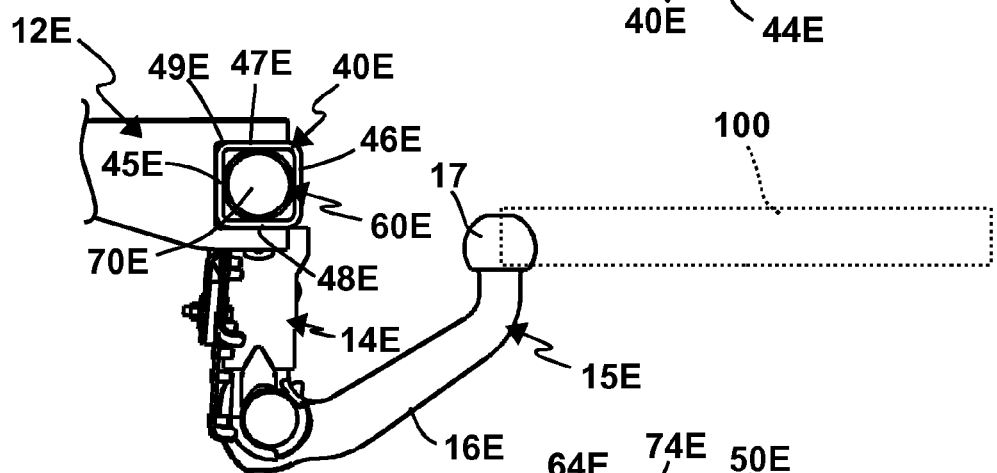

FIG. 11 a cross-section through the support assembly according to FIG. 9, roughly along a section line C-C FIG. 12 a perspective oblique view of a support assembly of a trailer coupling with a support profile, rectangular in cross-section, in which a further support profile, round in cross-section, is held FIG. 13 a side view of a front part of the support assembly according to FIG. 12, roughly in the direction of view R1

Figure 14:
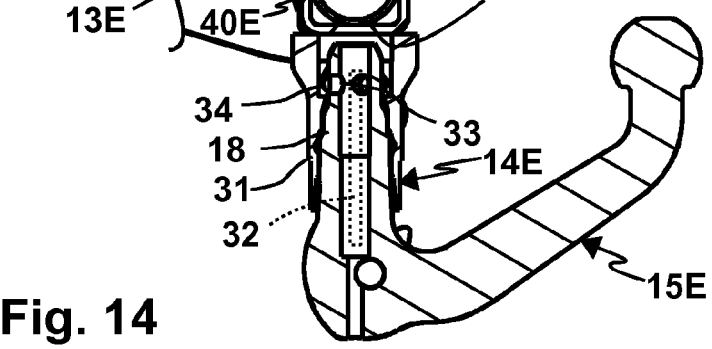
Figure 15:
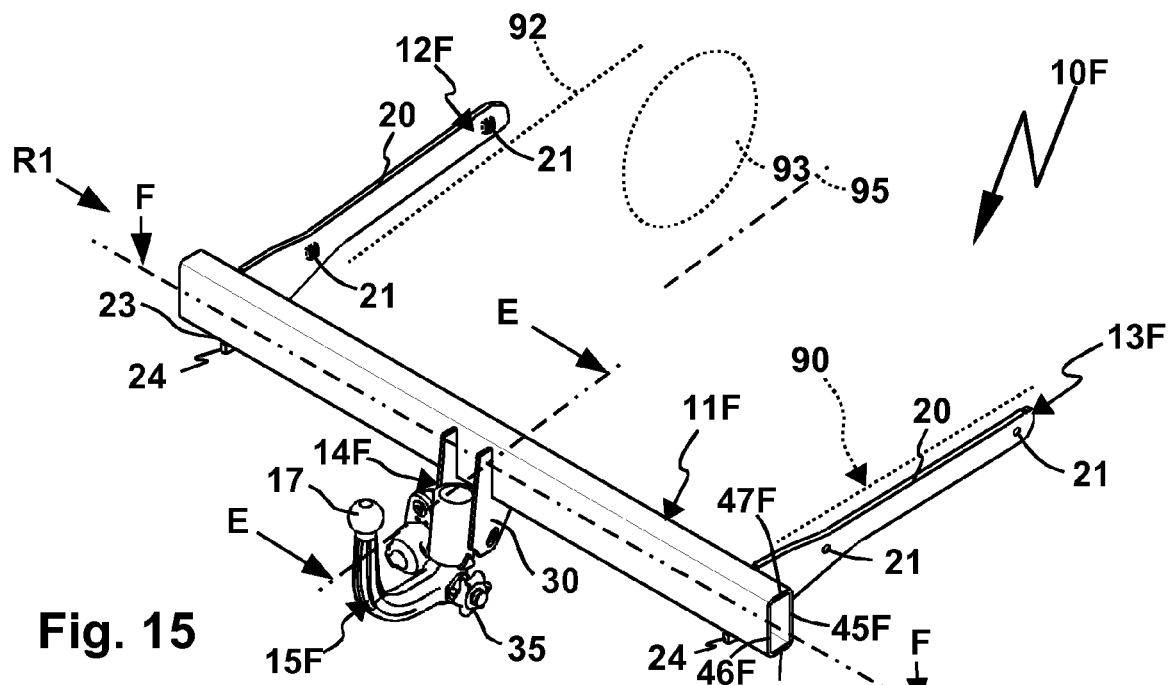
Figure 16:
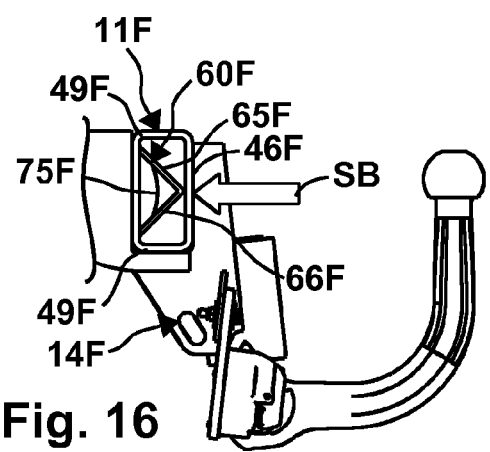

FIG. 14 a cross-section through the support assembly according to FIG. 12, roughly along a section line D-D FIG. 15 a perspective oblique view of a support assembly of a trailer coupling with a support profile in which a reinforcing profile, roof-edge-like in cross-section, is held FIG. 16 a side view of a front part of the support assembly according to FIG. 15, roughly in the direction of view R1

Figure 17:
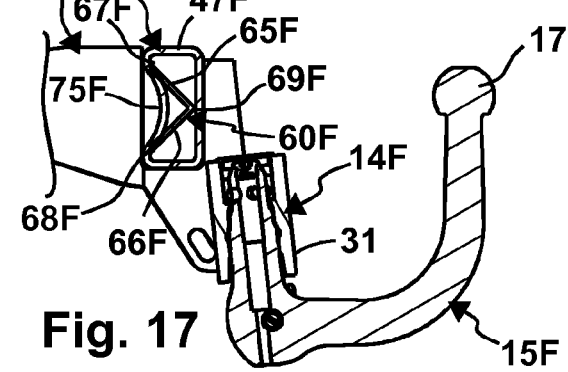
Figure 18:
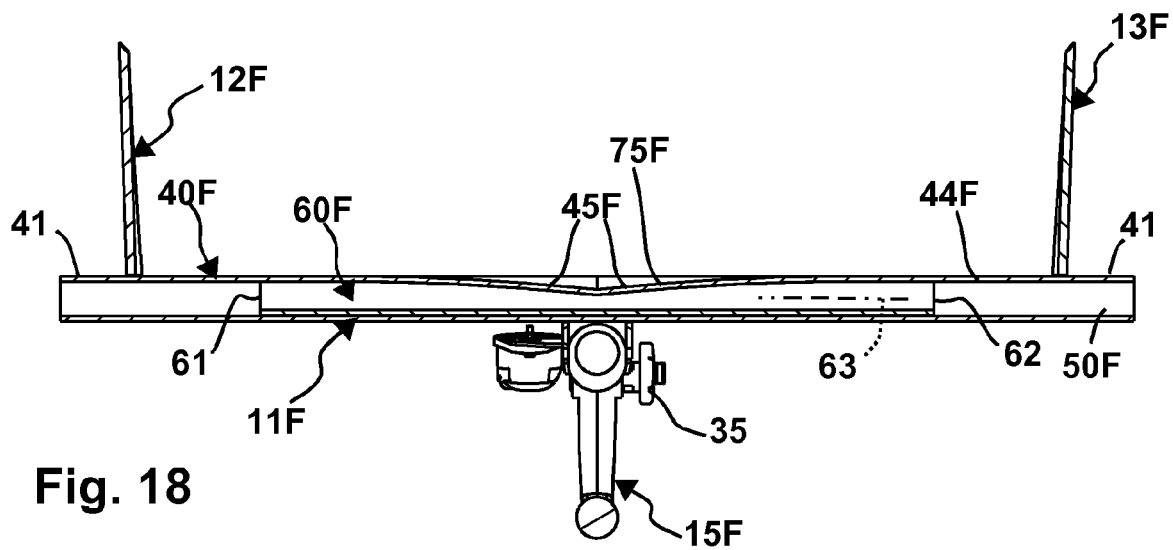

FIG. 17 a cross-section through the support assembly according to FIG. 15, roughly along a section line E-E FIG. 18 a longitudinal section through the support assembly according to FIG. 15, roughly along a section line F-F FIG. 19 a perspective oblique view of a support assembly of a trailer coupling with a support profile in which a reinforcing profile, round in cross-section, is held in part FIG. 20 a central longitudinal section through the support assembly according to FIG. 19, roughly along a section line G-G FIG. 21 a side view of a front part of the support assembly according to FIG. 19, roughly from a direction of view R1

FIG. 22 a cross-section through the support assembly according to FIGS. 19, 20, roughly along a section line H-H in FIG. 20

Figure 23:
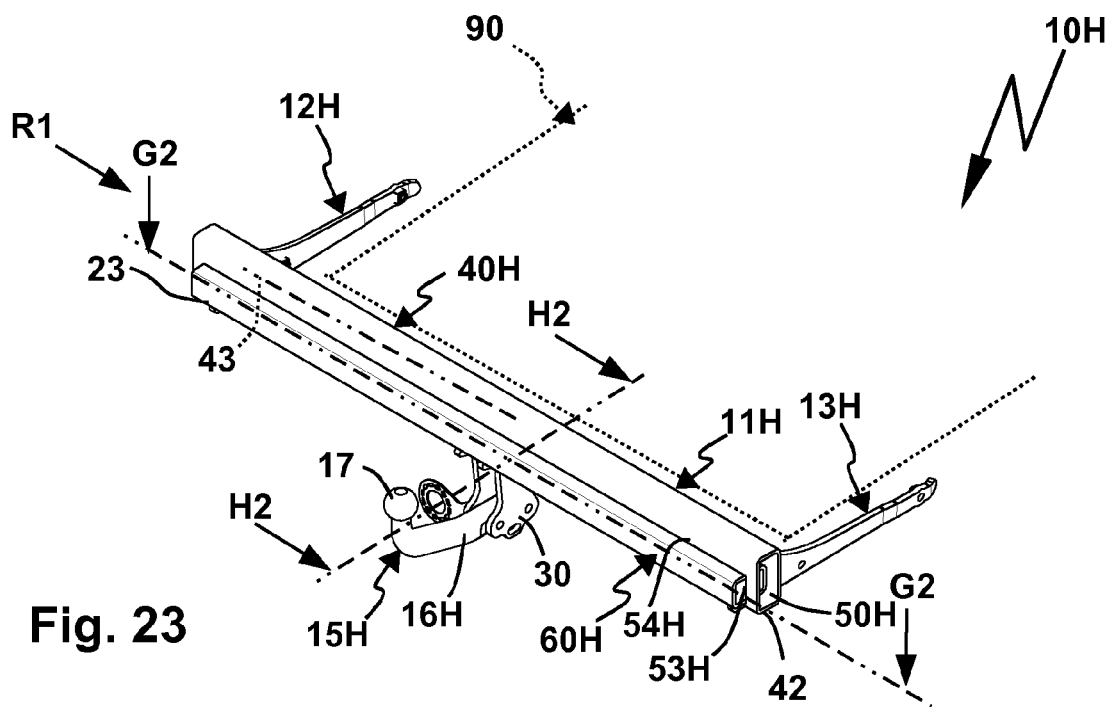
Figures 24, 25:
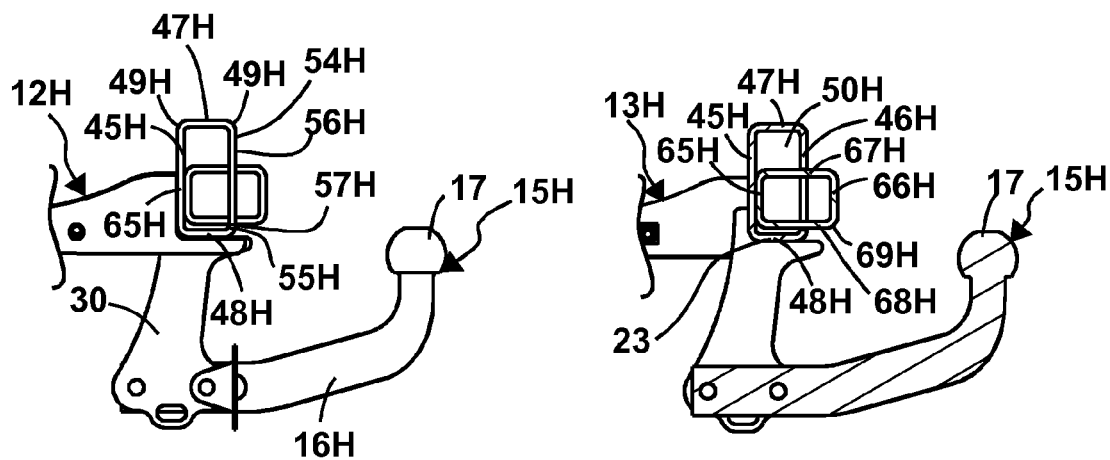

FIG. 23 a perspective oblique view of a support assembly of a trailer coupling with a support profile in which a support profile, rectangular in cross-section, partly holds a reinforcing profile, rectangular in cross-section FIG. 24 a side view of a front part of the support assembly according to FIG. 23, roughly along a direction of view R1 in FIG. 23

FIG. 25 a cross-section through the support assembly according to FIG. 23, roughly along a section line H2-H2

Figure 26:
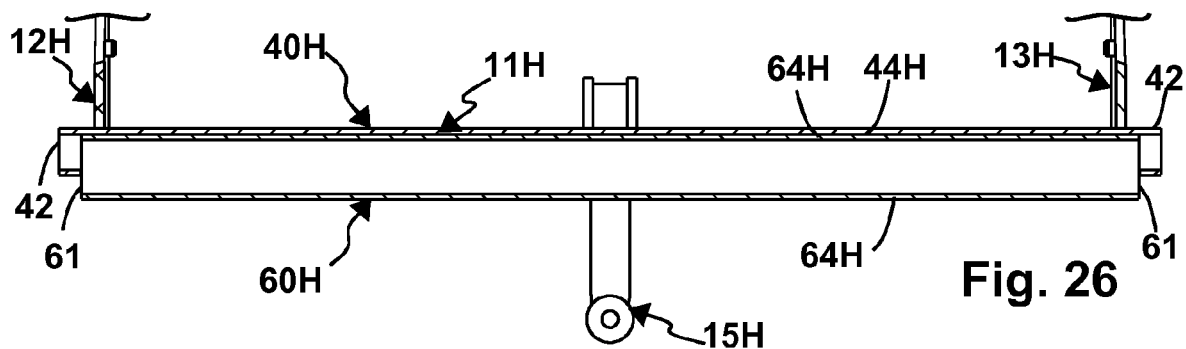

FIG. 26 a longitudinal section through the support assembly according to FIG. 23, roughly along a section line G2-G2 in FIG. 23

Figure 27:
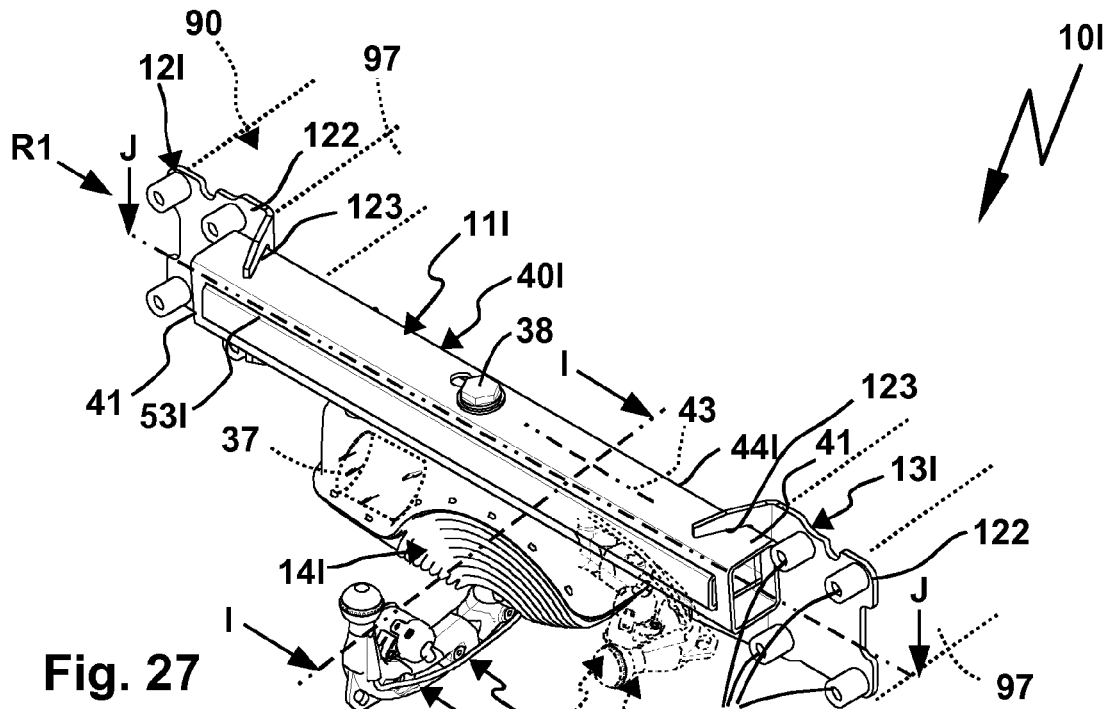
Figure 28:
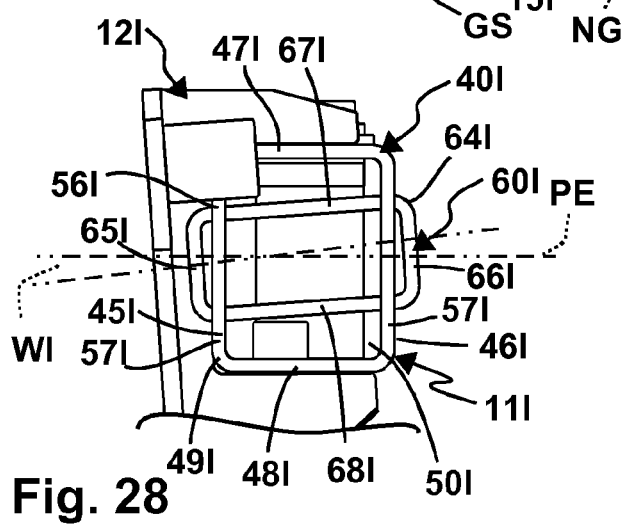

FIG. 27 a perspective oblique view of a trailer coupling with a pivotable coupling arm, the support assembly of which has a support profile, rectangular in cross-section, through which a reinforcing profile, rectangular in cross-section, passes in a cross pattern FIG. 28 a partial side view of the support assembly according to FIG. 27, roughly from a direction of view R1

Figure 29:
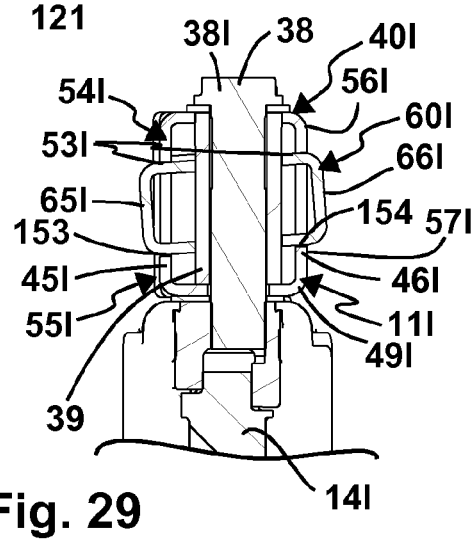
Figure 30:
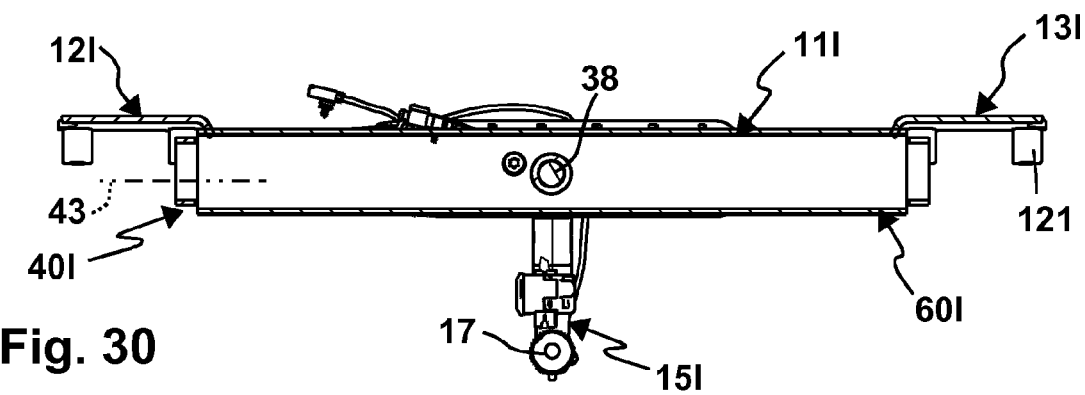
Figure 31:
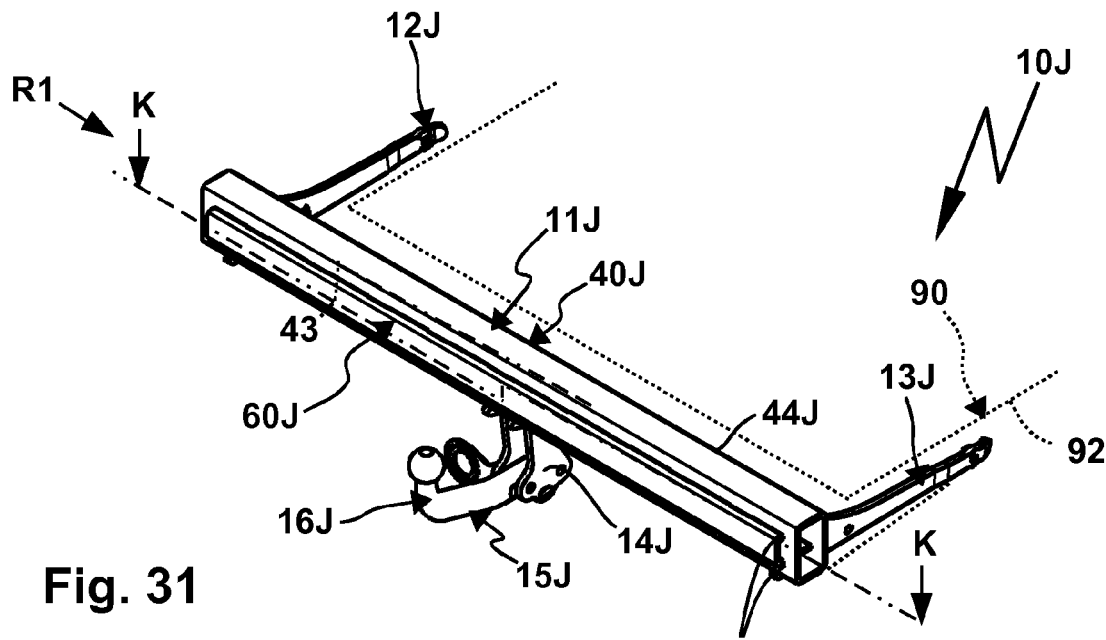
Figure 33:
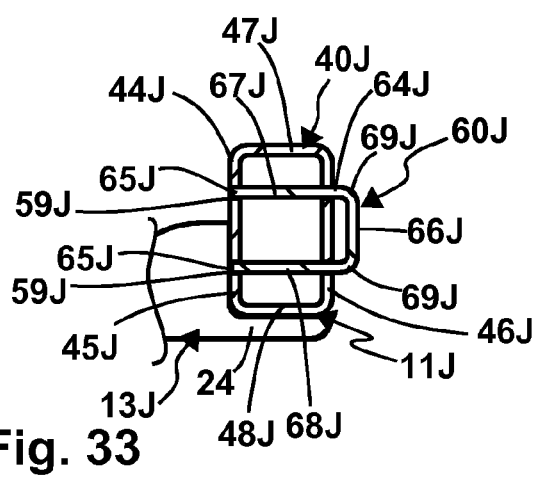
Figure 32:
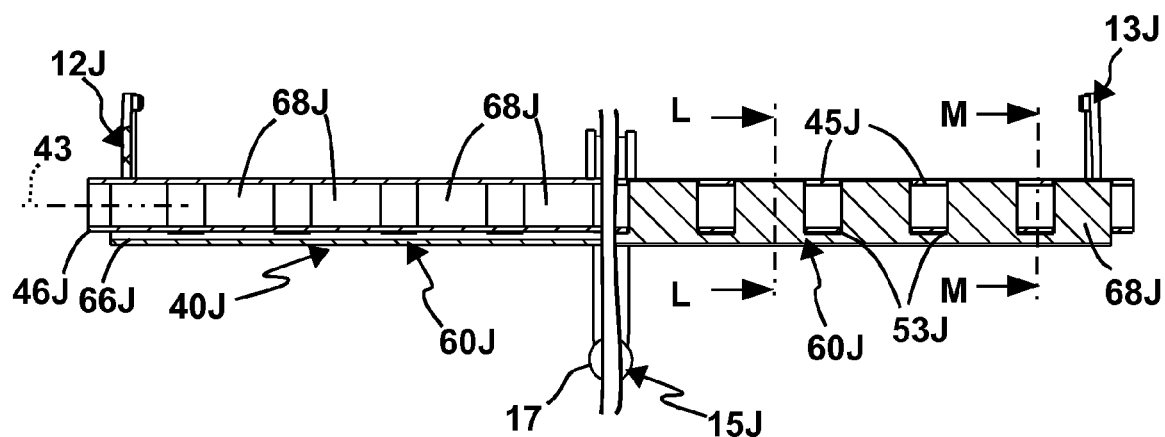

FIG. 29 a partial side view through the support assembly according to FIG. 27, roughly along a section line I-I FIG. 30 a longitudinal section through the support assembly according to FIG. 27, roughly along a section line J-J FIG. 31 a perspective oblique view of a support assembly with trailer coupling, with a support profile, rectangular in cross-section, which is reinforced by a U-shaped reinforcing profile FIG. 32 a longitudinal section through the support assembly according to FIG. 31, roughly along a stepped section line K-K in the longitudinal centre of the support assembly FIG. 33 a cross-section through the support assembly according to FIG. 31, roughly along a section line L-L in FIG. 32

Figure 34:
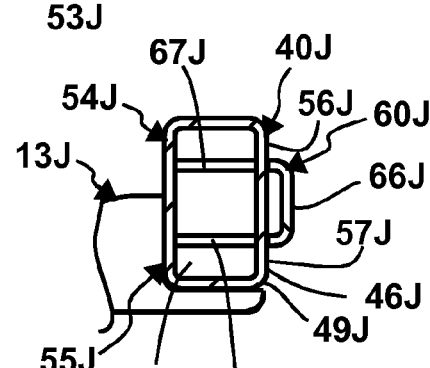

FIG. 34 a cross-section through the support assembly according to FIG. 31, roughly along a section line M-M in FIG. 32

Figure 35:
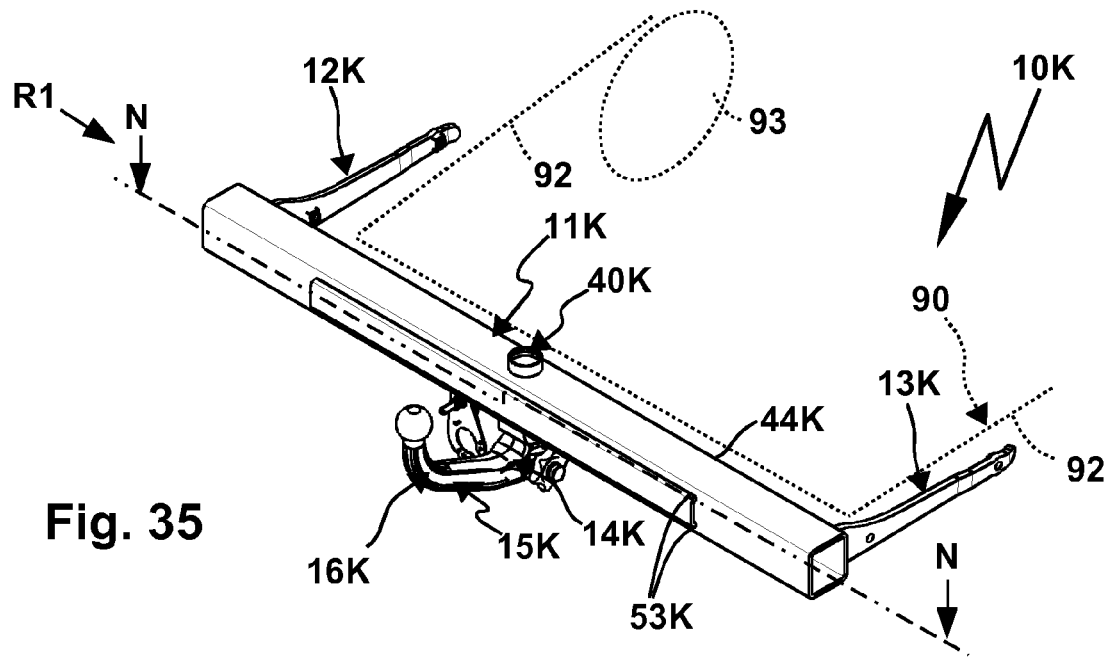
Figure 37:
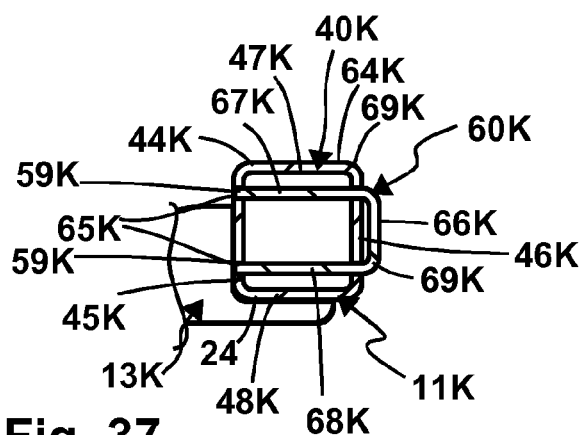
Figure 36:
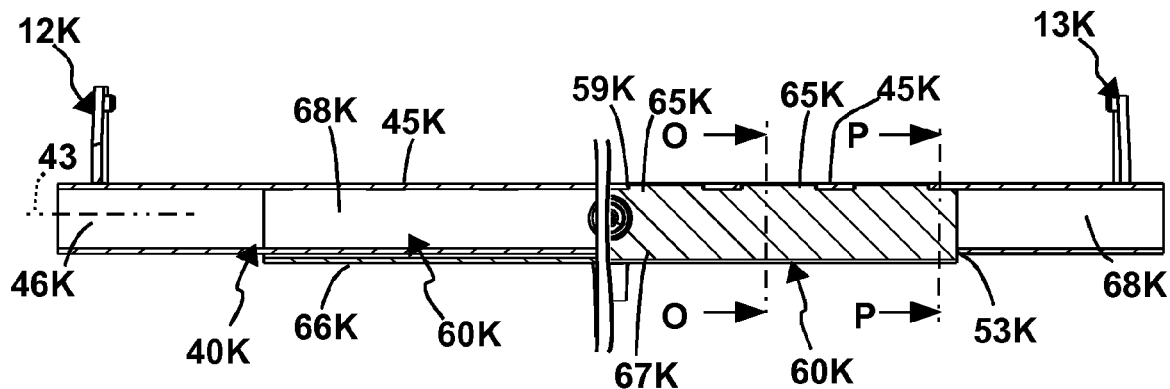

FIG. 35 a perspective oblique view of a support assembly with trailer coupling, with a support profile, rectangular in cross-section, which is reinforced by a U-shaped reinforcing profile FIG. 36 a longitudinal section through the support assembly according to FIG. 35, roughly along a stepped section line N-N in the longitudinal centre of the support assembly FIG. 37 a cross-section through the support assembly according to FIG. 35, roughly along a section line O-O in FIG. 36

Figure 38:
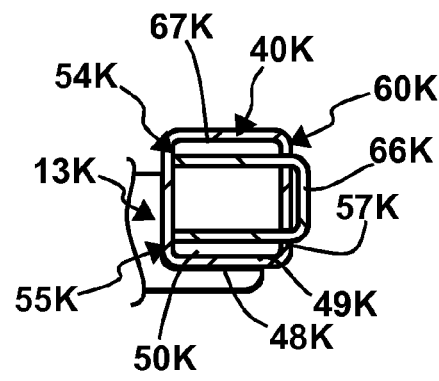

FIG. 38 a cross-section through the support assembly according to FIG. 35, roughly along a section line P-P in FIG. 36

Figure 39:
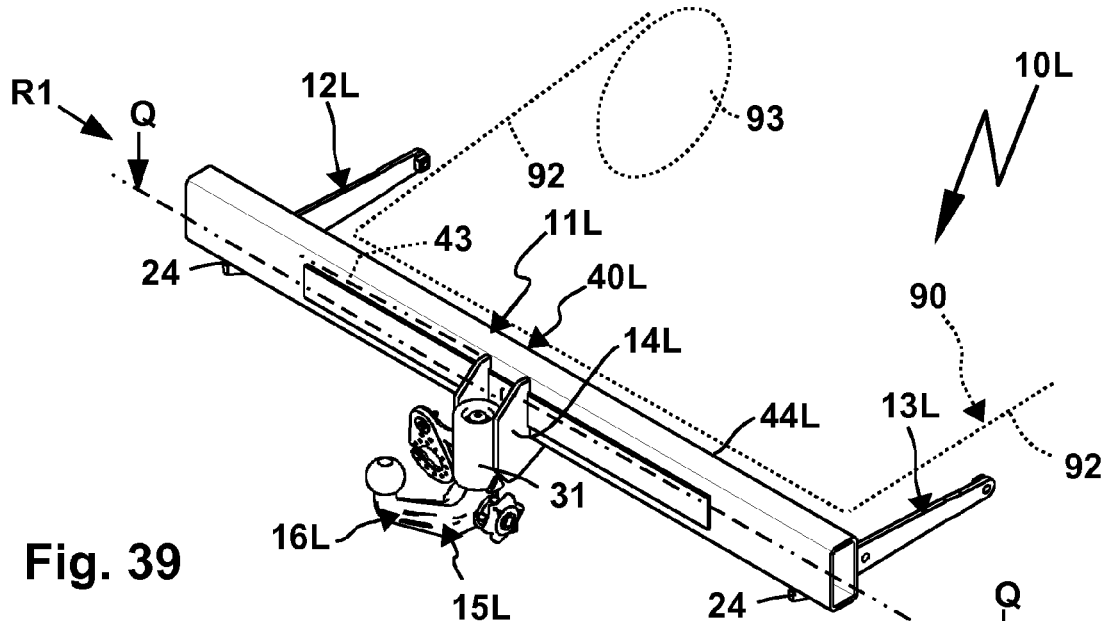
Figure 41:
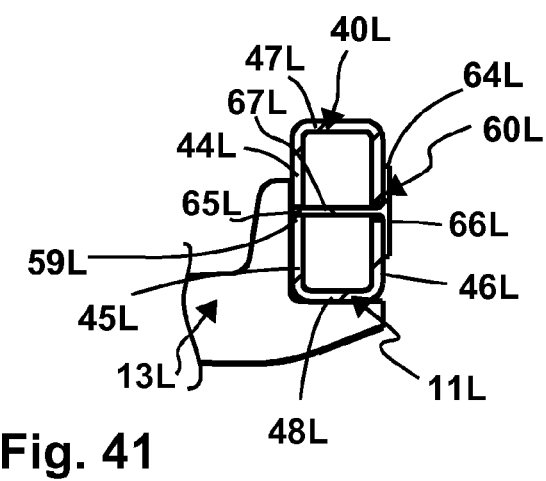
Figure 40:
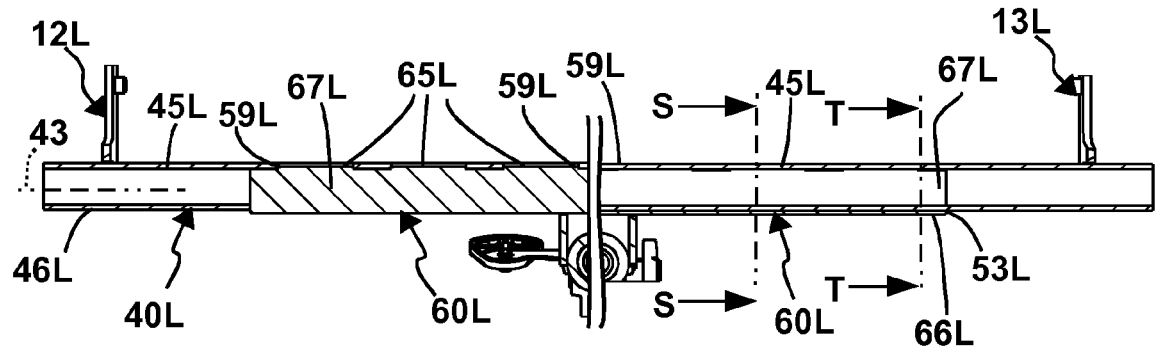

FIG. 39 a perspective oblique view of a support assembly with trailer coupling, with a support profile, rectangular in cross-section, which is reinforced by a T-shaped reinforcing profile FIG. 40 a longitudinal section through the support assembly according to FIG. 39, roughly along a stepped section line Q-Q in the longitudinal centre of the support assembly FIG. 41 a cross-section through the support assembly according to FIG. 39, roughly along a section line S-S in FIG. 40

Figure 42:
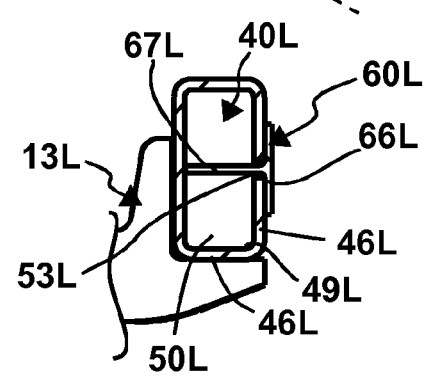

FIG. 42 a cross-section through the support assembly according to FIG. 39, roughly along a section line T-T in FIG. 40

Figure 43:
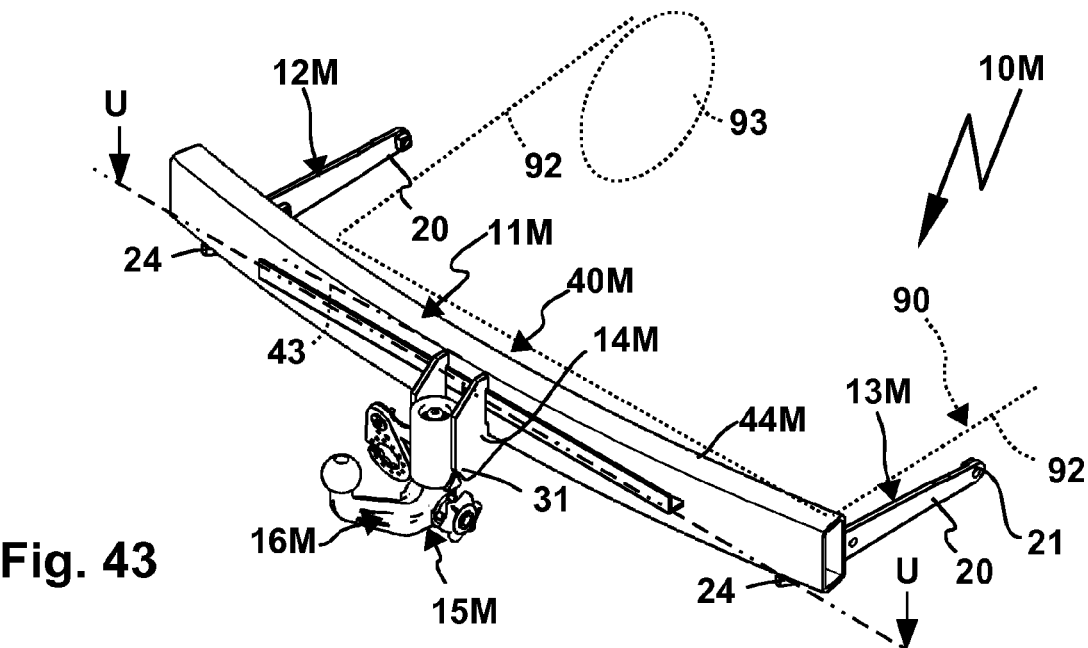
Figure 45:
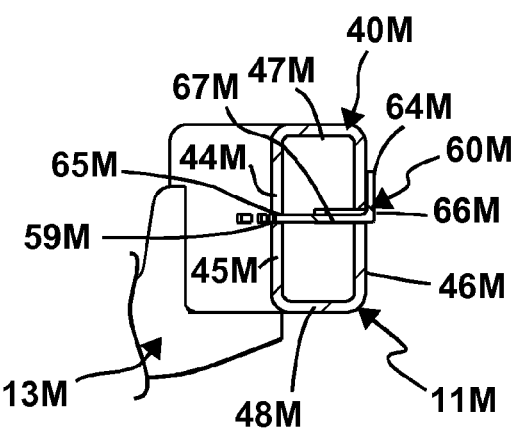
Figure 44:
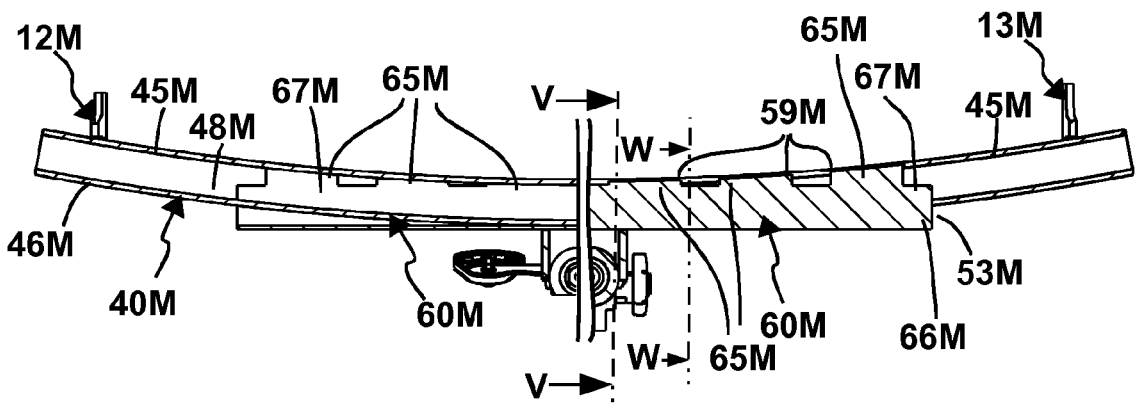

FIG. 43 a perspective oblique view of a support assembly with trailer coupling, with a support profile, rectangular in cross-section, which is reinforced by an L-shaped reinforcing profile FIG. 44 a longitudinal section through the support assembly according to FIG. 43, roughly along a stepped section line U-U in the longitudinal centre of the support assembly FIG. 45 a cross-section through the support assembly according to FIG. 43, roughly along a section line V-V in FIG. 44

Figure 46:
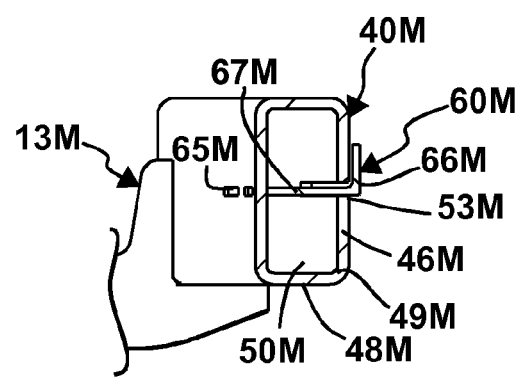

FIG. 46 a cross-section through the support assembly according to FIG. 43, roughly along a section line W-W in FIG. 44

Figure 47:
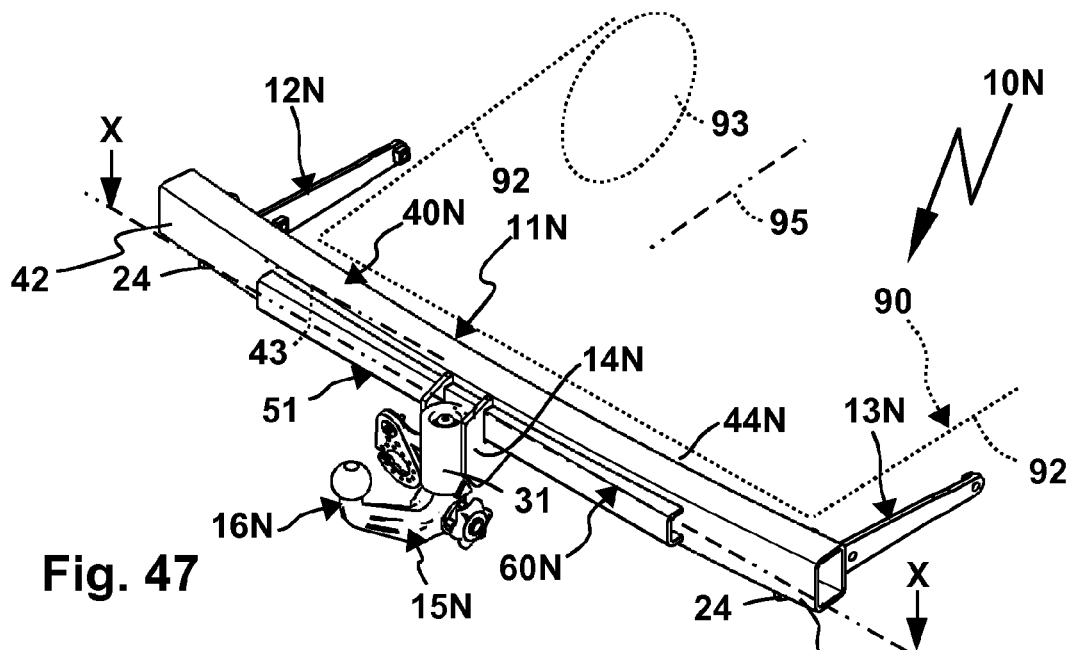
Figures 49, 50:
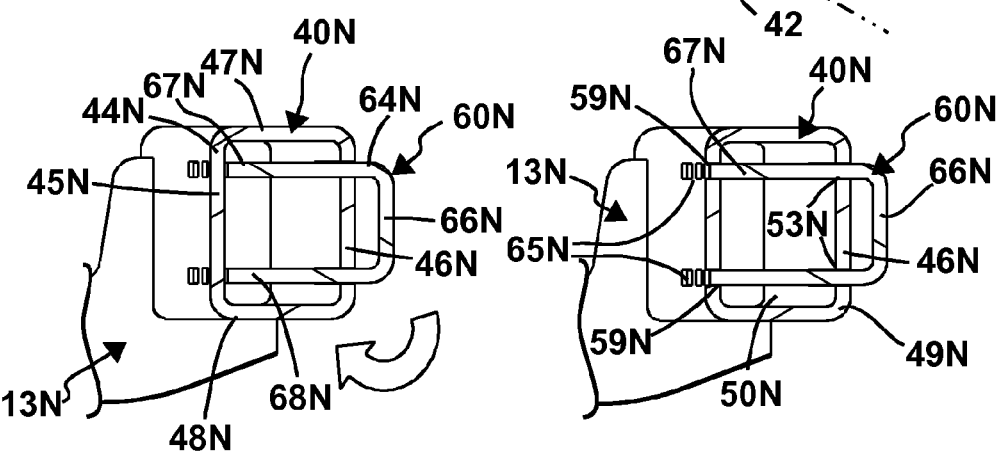
Figure 48:
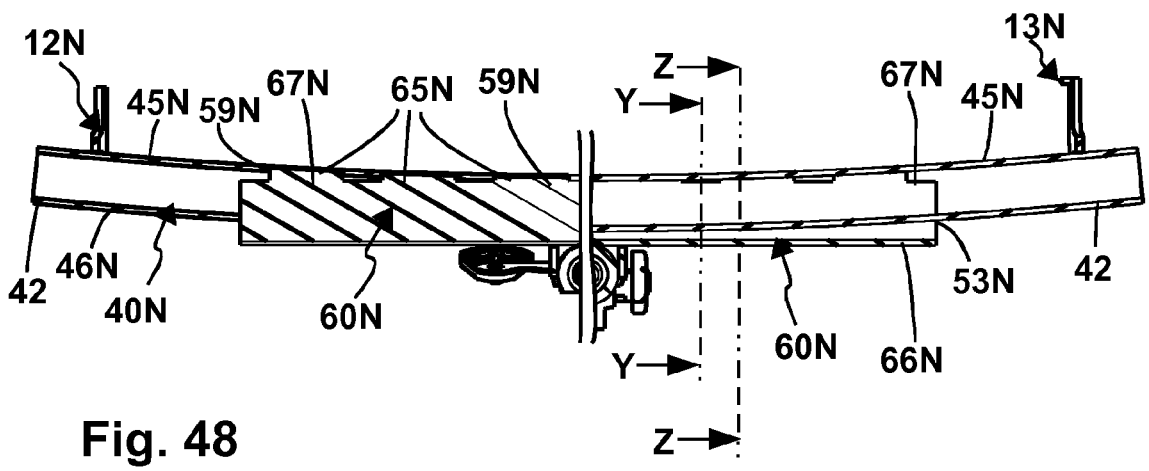

FIG. 47 a perspective oblique view of a support assembly with trailer coupling, with a support profile, rectangular in cross-section, which is reinforced by a U-shaped reinforcing profile FIG. 48 a longitudinal section through the support assembly according to FIG. 47, roughly along a stepped section line X-X in the longitudinal centre of the support assembly FIG. 49 a cross-section through the support assembly according to FIG. 47, roughly along a section line Y-Y in FIG. 48

FIG. 50 a cross-section through the support assembly according to FIG. 47, roughly along a section line Z-Z in FIG. 48

Figure 51:
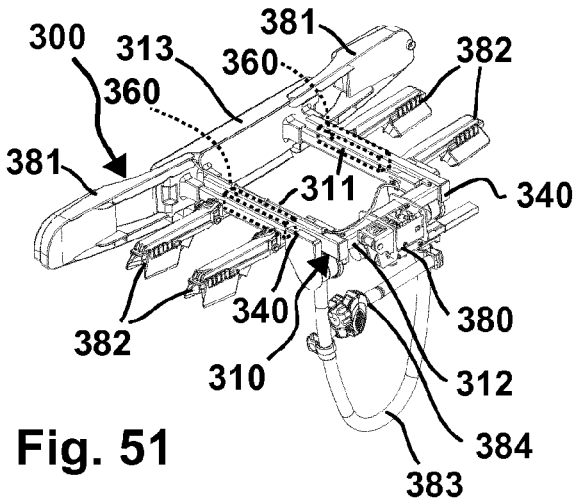

FIG. 51 a perspective oblique view of a load carrier at an angle from below, wherein the load carrier has a support frame which has a support profile with reinforcing profile.

Shown in the drawing are support assemblies 10A, 10B, 10C, 10D, 10E, 10F, 10G, 10H, 10I, 10J, 10K, 10L, 10M and 10N, which have partly similar or identical components. Where these components are identical, they have the same reference number. In the description below, as a rule the same reference number is used, but with the addition of a capital letter A-N corresponding to the respective support assembly 10A-10N.

The support assemblies 10A-10N are provided for fitting to a rear end of a vehicle 90, for example a car, a van or the like. The vehicle 90 is preferably an electric vehicle, or a hybrid vehicle which is at least partly electrically powered. A body 92 of the vehicle 90 has a rear section or rear end 91. Of the wheels 93, FIG. 1 shows by way of example only a rear wheel. Preferably the vehicle 90 has two rear wheels 93, plus front wheels 93 which are not depicted. Between the front and rear wheels 93 there is advantageously an energy store 94, for example an array of battery cells which require protection. If there is an impact on the rear end 91 of the vehicle 90, the batteries or the energy store 94 are to be protected from damage. In particular the rear end 91 of the body 92 should deform only to a predetermined extent, so that the energy store 94 is not damaged. Critical in particular is the fact that electrical connections of an energy store, for example the energy store 94, are frequently located in a rear section of the vehicle concerned, i.e. close to the rear end 91. In the event of a rear impact, this may lead to short-circuiting of the connections so that, in an extreme case, the energy store 94 catches fire. Mechanical connections of the energy store to the motor vehicle and/or the mechanical components of the electrical connections are also sensitive and require protection. To avoid any such hazard situation, the support assemblies 10A-10N are especially solid in design, as will become clear below.

The support assemblies 10A-10N have individual cross-members 11 designated as cross-members 11A-11N, which extend transversely to a vehicle longitudinal axis 95 of the vehicle 90. For example, the cross-members 11A-11N are arranged between the body 92 and a bumper covering or bumper 96 of the vehicle 90, as partly indicated in the drawing. It is however also quite possible for the cross-member 11A-11N to form the bumper of the vehicle 90, or at least represent a part of the bumper. It is however advantageous if the cross-member 11A-11N is covered by a bumper covering and/or a rear apron of the vehicle 90, i.e. is not visible in the position of use.

The cross-members 11A-11N are fastened to the vehicle 90 with the aid of side members 12 and 13 respectively, designated as side members 12A-12N and 13A-13N. For example side members 12A-12N, 13A-13N are or may be fastened to longitudinal members 97 of the body 92 of the vehicle 90, e.g. screwed and/or bonded and/or welded.

The cross-members 11A-11N carry mountings 14A-14N for example for a trailer coupling 15A-15N for attaching a trailer 100. Naturally, the trailer coupling 15A-15N may also be slipped over a load carrier, for example a cycle rack, so that the mounting 14 in principle also carries or holds with the trailer coupling 15 a load carrier coupling part. The plug-in locations for the trailer coupling 15A-15N described below are however also readily suitable for a coupling element, for example a plug-in projection of a load carrier, for attaching this releasably to the vehicle 90 and removing it from the vehicle 90 when not in use.

The side members 12A and 13A, 12C and 13C, 12D and 13D, 12E and 13E, 12F and 13F, 12H and 13H, 12J and 13J, 12K and 13K, 12L and 13L, 12M and 13M plus 12N and 13N have sword-like or elongated side member base bodies 20 which to some extent have different cross-sectional or outer peripheral contours, which however will not be considered in detail. At any rate, screw sockets 21 or other mounting means for mounting on the body 92 of the vehicle 90 are provided on the side member base bodies 20. It is also advantageous if the side member base bodies 20 have deforming structures 22, for example sections running obliquely or at an angle, transversely to their longitudinal axis which, in the event of an impact on the rear end 91 of the vehicle 90, are able to absorb energy through deformation.

Provided at a longitudinal end section of each side member base body 20 is a cross-member seating 23 for holding the relevant cross-member 11. The cross-member seating 23 is bounded by a support arm 24 and optionally a holding arm 25. In the position of use of the support assembly 10, the support arm 24 is arranged above and the holding arm 25 below. For example the two arms 24 and 25 clamp the respective cross-member 11. The support arm 24 and the holding arm 25 may be fork-shaped. Screw connections, welded joints or the like may be provided in the connection zone between the cross-member 11 and the cross-member seating 23. The holding arm 25 is optional. For example it is not provided for the side members 12J, 13J, where the cross-member seating 23 is as it were in the form of a holding bracket supporting the cross-member 11 from below The side members 12G and 13G together with 121 and 131 are in the form of holding brackets or holding plates. Their side member base bodies 120 have screw sockets, not visible in the drawing, which are penetrated by connecting pins 121, in particular threaded bolts. The connecting pins 121 are screwed to the body 92 for example its longitudinal members 97. The side member base bodies 120 are plate-like and have cross-member seating locations 123 in which the respective cross-member 11G, 11I is held. The cross-member seating locations 123 are bounded by support arms 124 and holding arms 125. The support arms 124 and holding arms 125 protrude from a base plate 122, on which screw sockets are provided, preferably inclined at an angle to the respective cross-members 11G and 11I. The cross-member 11G, 11I may be held in the cross-member seating 123 for example in a clamp fit, with form-fitting, material bonding or the like, for example with the aid of welding with at least one weld seam, spot welding or the like.

In the support assembly 10B, its side members 12B, 13B are made of one piece, integral with the cross-member 11B. Its side member base bodies 220 protrude at an angle, in particular roughly a right-angle, from the cross-member 11B and may be screwed to the body 92 by means of connecting pins or threaded bolts, not shown in the drawing, being inserted through corresponding screw sockets 221 and joined to the body 92.

The relevant trailer coupling 15 may be fixed to the cross-member 11 permanently, releasably or movably. Thus for example a coupling arm 16A of the trailer coupling 15A, at the free end of which is provided a coupling element, in particular a coupling ball 17, is held firmly on the mounting 14A. The mounting 14A has in particular plate-like holding bodies 30 which protrude from the cross-member 11A and between which the coupling arm 16A is held, for example with the aid of a weld and/or a screw connection.

The trailer coupling 15B is however releasably mounted on the assigned mounting 14B. The mounting 14B has for example a locating sleeve 31, in which an insertion end air outlet zone 18 of the coupling arm 16B may be inserted. This concept is also realised for the support assemblies 10E, 10F, 10L, 10M and 10N, for which in each case such a locating sleeve 31 is provided. At the same time it is possible for the locating sleeve 31 to be fastened directly to the cross-member 11, for example in the case of the mounting 14B, 14E, 14K or to be held to the respective cross-member 11 with the aid of holding bodies 30, as e.g. in the case of the support assembly 10F, 10L, 10M and 10N in which the locating sleeve 31 is held in sandwich fashion between the holding bodies 30, which are for example in the form of holding plates. The holding bodies 30 for their part are in turn for example welded, screwed or the like to the respective cross-member 11.

The locking concept in connection with the locating sleeve 31 is made somewhat clearer in particular by FIG. 17. Movably mounted on the coupling arm 16 is for example an actuating body 32, in particular slidably mounted, by which locking bodies 33, in particular balls which are movably mounted on the coupling arm 16, in particular with radial movement ability, may be actuated between a locking position, in which they engage in a locking location 34 of the locating sleeve 31, and an unlocked position in which they are or may be moved out of the locking location 34. The actuating element 35 is for example a handwheel or other similar actuating body which acts on the actuating body 32 directly or through a gear not shown in the drawing.

In the support assemblies 10G and 10I, the coupling arm 16G and 16I is movably mounted between a position of use GS and an inoperative position NG, for example able to swivel or shift around a swivel axis SC. In the position of use GS, the coupling arm 16G, 16I extends to the rear beyond the rear end 91, in particular also the bumper 96, so that the trailer 100 may be attached or a load carrier 101 put on to the coupling arm 16G, 16I. In the inoperative position NG, the coupling arm 16G, 16I is moved back towards the rear end 91, for example wholly or partly under the bumper 96.

The coupling arm 16G or 16I may be driven by a motor drive 37 between the position of use GS and the inoperative position NG, for example by an electric motor and/or may be locked in the position of use GS or the inoperative position NG or both, for example by a locking method similar to that described in connection with the locating sleeve 31. Motorised unlocking and/or locking is possible for example with the aid of an unlocking drive 36, which may also be regarded as a locking drive.

It is recognised that, in the event of a rear impact on the vehicle 90, the support assembly 10 concerned must withstand not only a force in the direction of the vehicle longitudinal axis 95 but also a torsional load, resulting for example from the fact that the coupling arm 16 exerts force on the mounting 14 in the manner of a swivel lever, so that the cross-member 11 is torsionally loaded around its longitudinal axis. Due to the reinforcing measures explained below, the respective cross-member 11 is however so stiffened and reinforced that, in the event of a rear impact on the vehicle 90 it provides optimal stiffness and thus optimal protection for the energy store 94.

The cross-members 11A-11N have support profiles 40A-40N, i.e. quite generally support profiles 40 which are reinforced by reinforcing profiles 60, namely reinforcing profiles 60A-60N. There is however no problem in producing the side members 12A-12N, 13A-13N in this manner, i.e. support profiles with reinforcing profiles, as will be explained in detail below. The support profiles 40A-40N are for example in the form of tubular bodies.

Longitudinal end sections 41 of the support profiles 40A-40N are held on the side members 12A-12N and 13A-13N, while the mounting 14A-14N is arranged in the longitudinal centre of the support profile 40. Located in the central section of the support profile 40 is for example a reinforcing section 51, while at the longitudinal end sections 41, reinforcing sections 52 may be provided optionally, as will become clearer below.

The support profile 40A-40N extends along a substantially straight longitudinal axis 43, in some embodiments also completely or partly curved. The support profiles 40A-40N thus have an elongated shape.

The support profiles 40A-40N have peripheral walls 44, each bounding or encompassing an interior 50. The support profiles 40A-40N have for example concrete peripheral walls 44A-44N which have a rectangular or round cross-section.

Thus for example the rectangular cross-sections of the support profiles 40A, 40B, 40C, 40D, 40E, 40F, 40G, 40H, 40I, 40J, 40K, 40L, 40M, 40N have peripheral wall sections 45, 46 running or oriented substantially vertically in the position of use, between which there extend in the position of use substantially horizontally running peripheral wall sections 47 and 48. The peripheral wall sections 45, 46, 47 and 48 of the support profiles 40A, 40B, 40C, 40D, 40E, 40F, 40G, 40H, 40I, 40J, 40K, 40L, 40M, 40N are partly also designated by capital letters A-N for the identification of differences.

The peripheral wall section 45 for example faces the rear end 91, while the peripheral wall section 46 faces away from the rear end 91. The peripheral wall sections 47 and 48 form upper and lower peripheral wall sections. The peripheral wall sections 45-48 may be connected across the corner or square. Preferred however is a round or rounded transition, for example in rounded-out edge areas 49 between the peripheral wall sections 45 to 48. The edge area 49 runs parallel or substantially parallel to the longitudinal axis 43.

The peripheral wall 44A-44N bounds an interior 50A-50N which is wholly or partly closed. Consequently the respective support profile 40A-40N is in itself already extremely strong and resistant to bending, but will also be further reinforced by the following reinforcing measures.

The support profile 40A is e.g. provided with reinforcing profiles 60A, 160A, which are in the form of slip-on bushings or sleeves. The reinforcing profiles 60A, 160A have peripheral walls 64A with an inner contour corresponding to the outer contour of the peripheral wall 44A and the support profile 40A respectively, so that the reinforcing profiles 60A, 160A as it were match the support profile 40A with form-fitting.

The peripheral wall 64A has for example side wall sections 65A, 66A which in the position of use run substantially vertically or upright and between which are provided in the position of use side wall sections 67A, 68A running substantially horizontally or extending horizontally. The side wall sections 65A-68A are joined to one another over round edge sections or edge areas 69A. Preferably the side wall sections 65A-68A and/or the peripheral wall 44A are formed integrally from a single basic body.

At any rate the peripheral wall 64A bounds an interior 70 in which the support profile 40A engages. At the same time the support profile 40A is supported transversely to its longitudinal axis 43 by the reinforcing profile 60A, 160A. Between the outer periphery of the support profile 40A and the inner periphery of the reinforcing profile 60A, 160A it is possible to provide a material bonding connection, for example by bonding, welding or a soldered connection or a combination of these.

It is also possible that the support profile 40A is as it were expanded outwards in the course of internal forming, in particular through internal high-pressure forming, e.g. hydroforming, so that the reinforcing profiles 60A, 160A are held with form-fitting to the support profile 40A. Thus for example a deformation fluid, in particular water, may be pressed into the interior 50A.

The reinforcing profiles 60A are for example located at the longitudinal end sections 41 of the support profile 40A. A first longitudinal end 61 of a reinforcing profile 60A extends up to the respective longitudinal end 42 of the support profile 40A. Thus the latter is encased up to its longitudinal ends by the reinforcing profile 60.

Towards the lateral centre however the reinforcing profiles 60A have, at the longitudinal ends 62 opposite the longitudinal ends 61, end faces 71, i.e. narrow sides of the peripheral wall 64, which have an inclined course with respect to the longitudinal axis 43 of the support profile 40A and/or with respect to a longitudinal axis 63 of the reinforcing profile 60A. Provided for example on the end faces 71 are recesses 72, in particular returns, which are preferably trough-shaped or rounded out. The recess 72 extends for example, in the case of the upper and/or lower side wall sections 65A, 66A, back from the edge areas 69A, so that the reinforcing profile 60A is as it were longer in the edge areas 69A than in a space between the edge areas 69A. The reinforcing profile 160A has at both longitudinal end sections relative to the longitudinal axis 43 or 63 in each case a recess 72. The recesses 72 are indeed provided at the upper-side and/or lower-side sections of the peripheral wall 64A. Alternatively or additionally however, sloping edges, rounded areas or recesses in the manner of the recesses 72 would be possible on the vertically running side wall sections, for example the side wall sections 65A and/or 66A.

For the support assembly 10B, the cross-member 11B has a central reinforcing section 51 together with reinforcing sections 52, which are provided in the transition zones between the cross-member 11B and the side members 12B, 13B.

The cross-member 11B has a support profile 40B with, in the position of use, upper and lower side walls or peripheral wall sections 47A, 47B which, transversely to the longitudinal axis 43 of the support profile 40B, are wider than side peripheral wall sections 45B, 46B which extend between the peripheral wall sections 47B, 48B.

On the central reinforcing section 51, a reinforcing profile 60B is held in the interior 50B of the support profile 40B. The reinforcing profile 60B corresponds, in its outer peripheral contours and/or with regard to its longitudinal extent relative to the longitudinal axis 43, to the reinforcing profile 160A. The reinforcing profile 160A is arranged centrally on the cross-member 11B. Varying from the reinforcing profile 160A, the reinforcing profile 60B is located not on the outer periphery but instead on the inner periphery of the support profile 40B of the cross-member 11B.

The reinforcing profile 60B has an outer peripheral contour which corresponds to an inner peripheral contour of the support profile 40B on its inner periphery, so that the reinforcing profile 60B makes form-fitting contact in the interior 50B at the inner periphery of the 40B. The reinforcing profile 60B has side wall sections 65B-68B corresponding to the side wall sections 65A-68A, between which are provided rounded edge areas 69B corresponding to the rounded edge areas 49B of the support profile 40B. Consequently the reinforcing profile 60B in the interior 50B also makes form-fitting contact with its edge areas 69B on the inner peripheral contour of the support profile 40B. Between the reinforcing profile 60B and the support profile 40B a form-fitting or material bonding connection may be provided, for example a soldered connection, welded joint or adhesive bond. It is also possible that, if the reinforcing profile 60B is located in the interior 50B, the peripheral wall 44B of the support profile 40B is deformed in the reinforcing section 51 in the direction of the reinforcing profile 60B, so that it has for example an indentation or notch 73B which engages at least partly also in a resulting recess of the side wall sections 65B-68B and thus makes possible a form-fitting hold of the reinforcing profile 60B on the support profile 40B.

Further reinforcing profiles 160B, for example tubular bodies, are provided at the transition zones or connection zones of the cross-member 11B with the side members 12B, 13B. In cross-section, the reinforcing profiles 160B are preferably round. Their peripheral walls 64B therefore have a round outer peripheral contour. It would however also be easily possible to have a polygonal, in particular a rectangular or flat-rectangular outer peripheral contour of the reinforcing profiles 160B.

The reinforcing profiles 160B are completely accommodated in the interior 50B of the cross-member 11B and the interiors 250 of the side members 12B, 13B.

The side members 12B, 13B are integral with the cross-member 11B or made from a single blank. The side members 12B, 13B accordingly have a peripheral wall 244. The peripheral wall 244 has a peripheral wall section 246 facing away from the body 92, together with a peripheral wall section 245 facing the body 92 in the transition zone to the cross-member 11B, between which the peripheral wall sections 247, 248 extend. The peripheral wall sections 245-248 bound the interiors 250. To the free end sections facing away from the cross-member 11B, the side members 12B, 13B have only the peripheral wall sections 245, 247, 248, but not the peripheral wall section 245 facing the body 92. The side members 12B, 13B are therefore as it were partly open towards the body 92.

The reinforcing profiles 160B have side legs 161, 162, between which is a curved section 163.

Cut out of the basic material from which the peripheral wall sections 47, 48, 247, 248 are formed are for example notches or angular segments, so that the blank may be formed into the support assembly 10B and the support profile 40B respectively, as shown in FIGS. 3, 5. At the same time it is possible that the reinforcing profiles 160B have already been placed in the interiors 50B, 250, i.e. that the blank is as it were bent around the reinforcing profiles 160B. Also possible however is a variant in which the reinforcing profiles 160B are pushed from the side members 12B, 13B into the interiors 250 and then as it were around a curved path into the interior.

For a secure hold of the reinforcing profiles 160B on the support profile 40B, bonding, welding or another kind of material bonding connection may be provided.

Preferred however is a form-fitting connection, for example with the aid of clips 280. The clips 280 have base legs 281, from which side legs protrude at an angle, for example at a right-angle.

The clips 280 serve expediently to fix an angular position of the side members 12B, 13B relative to the cross-member 11B. The base leg 281 is provided for example at a transition zone between the peripheral wall sections 47, 247. The side legs 282 protruding therefrom penetrate the interior 50B, 250 through clip holders 251 which are provided on the peripheral wall sections 47, 247 and preferably also on the peripheral wall sections 48, 248. The clips 280 may be connected to the cross-member 11B and/or the side members 12B, 13B by material bonding, for example welding or soldering.

The clips 280 also serve to fix the reinforcing profiles 160B relative to the support profile 40B.

The side legs 282 each have holders 283 which are bounded by side arms 284. The reinforcing profiles 160B are held between the arms 284. For example the curved section 163 of the reinforcing profile 160B engages in the holders 283. An inner peripheral contour of the holders 283 corresponds expediently to an outer peripheral contour of the reinforcing profile 160B.

It is also advantageous if the reinforcing profile 160B abuts the peripheral wall 44B of the support profile 40B with at least one section of its peripheral wall 164, and is there also materially bonded, for example welded or soldered. So for example the peripheral wall 164 is in contact with the peripheral wall sections 46, 247 and/or the peripheral wall sections 47, 247 and/or the peripheral wall sections 48, 248.

In the case of the support assembly 10C, a tube-in-tube construction of the cross-member 11C is as it were provided.

The support profile 40C of the support assembly 10C has a peripheral wall 44C with a round, preferably circular, outer periphery, while of course an elliptical, oval or other similar curved or round outer periphery is readily possible. Passing through the support profile 40C is a reinforcing profile 60C which has a polygonal outer periphery, for example a rectangular or square outer periphery. Readily possible alternatives to the rectangular outer periphery are a triangular outer periphery, an octagonal or hexagonal outer periphery. Preferably edge areas 69C of the outer periphery of the reinforcing profile 60C make contact with an inner periphery of the support profile 40C. At any rate the reinforcing profile 60C is fitted in the interior 50C of the support profile 40C.

In the edge areas 69C, a material bonding connection, for example a welded joint, adhesive bond, soldered connection or the like may be provided between the reinforcing profile 60C and the support profile 40C. But also a form-fitting connection, for example with the aid of notch recesses 75C, which are provided on the peripheral wall 44C of the support profile 40C in the direction of its interior 50C at one or more points relative to the longitudinal axis 43, may engage in corresponding recesses on the peripheral wall 64C of the reinforcing profile 60C. Preferably the notch recesses 75C are provided in the edge areas 69C.

The reinforcing profile 60C extends at any rate so far along the cross-member 11 that it also reinforces or strengthens the support profile 40C in the support area of the side members 12C, 13C. It is preferred if the reinforcing profile 60C extends over the whole axial length of the support profile 40C. Here it is even so that the longitudinal end 61 of the reinforcing profile 60C protrudes beyond the longitudinal end 42 of the support profile 40C. This is however not necessary.

It is preferred if the mounting 14C is provided at least partly by the cross-member 11C. So for example a shaft 18C of the coupling arm 16C may be located in a recess 19C which passes through both the support profile 40C and also the reinforcing profile 60C. The shaft 18C is preferably joined to the support profile 40C and/or the reinforcing profile 60C by form-fitting and/or material bonding.

The support assembly 10D is provided with a support profile 40D which has a flat-rectangular cross-section. In the position of use, upper and lower peripheral wall sections 47D, 48D of a peripheral wall 44D are narrower transversely to the longitudinal axis 43 of the support profile 40D than peripheral wall sections 45D, 46D running vertically or substantially vertically in the position of use. The peripheral wall 44D thus bounds an interior 50D.

Held in the interior 50D is a reinforcing profile 60D, which likewise has a rectangular, in particular square, cross-section transversely to the longitudinal axis 43 of the support profile 40D or the reinforcing profile 60D. While side wall sections 67D, 68D of a peripheral wall 64D of the reinforcing profile 60D have clearance from the opposing peripheral wall sections 47D, 48D, side wall sections 65D, 66D of the peripheral wall 64D lie flat on the inner sides of the peripheral wall sections 45D, 46D. A material bonding connection may be provided there. There would however be no problem in providing that the reinforcing profile 60D transverse to the longitudinal axis 43D has other positions relative to the support profile 40D, so that for example the side wall section 67D may fit closely to the peripheral wall section 47D or be arranged closer to it or also the side wall section 68D which is lower in the drawing may be in contact with the peripheral wall section 48D or be arranged closer to it.

In the case of the support assembly 10E, the cross-member 11E has a support profile 40E which has a peripheral wall 44E with rectangular, here for example square, cross-section. The support profile 40E is therefore for example a tubular body. Peripheral wall sections 45E-48E of the peripheral wall 44E have transversely to the longitudinal axis 43 of the support profile 40E the same lateral width or lateral height, which produces the square cross-section. There would however be no problem in providing a flat-rectangular or other polygonal cross-section in order to accommodate the reinforcing profile 60E described below in the interior 50E of the support profile 40E, which is bounded by the peripheral wall 44E.

The reinforcing profile 60E has a round, here circular, peripheral wall 64E. The peripheral wall 64E lies at a tangent, i.e. with its outer periphery, in contact zones 74E on the inner periphery of the support profile 40E, i.e. on the peripheral wall sections 45E-48E. There is realised preferably a material bonding and/or form-fitting connection, provided for example in the notch recesses in the manner of the notch recess 75C on the support profile 40E, in the contact zones 74E with the reinforcing profile 60E. In particular suitable as material bonding connection is a soldered connection or adhesive bond or a combination of both.

It goes without saying that, in the case for example of a flat-rectangular cross-section of a support profile, not depicted, in the manner of the support profile 40E, instead of the reinforcing profile with a round cross-section, a reinforcing profile with an oval, elliptical or other similar curved cross-section of its peripheral wall may also easily be fitted in the interior of the support profile.

Such a support profile has for example a cross-sectional contour like the support profile 40F of the support assembly 10F described below. The support profile 40F has a peripheral wall 44F, which defines a flat-rectangular cross-section of the support profile 40F. Peripheral wall sections 45F, 46F running substantially vertically in the position of use are accordingly wider transversely to the longitudinal axis 43 than upper and lower peripheral wall sections 47F, 48F of the peripheral wall 44F.

In support profile 40F, however, instead of a reinforcing profile closed on the periphery, there is provided a reinforcing profile 60F which has two side legs or side wall sections 65F, 66F protruding from one another at an angle. The side wall sections 65F, 66F are joined to one another in an edge area 69F.

The reinforcing profile 60F has preferably a form-fitting connection with the support profile 40F. Thus for example, through forming of the peripheral wall 44F, in particular of the peripheral wall section 45F, such a connection is created in which a recess 75F is formed on the peripheral wall 44F. The recess 75F extends for example inwards between the side wall sections 66F, 65F. It is possible that, because of this, free end sections 67F, 68F of the side wall sections or legs 65F, 66F are displaced towards edge areas 49F running parallel to the longitudinal axis 43 between the peripheral wall section 45F and the peripheral wall sections 47F, 48F. At any rate, the free end sections 67F, 68F are supported on the inner peripheral contour of the peripheral wall 44F created by the recess 75F. It is also advantageous if, due to the recess 75F, the edge area 69F is so shifted towards the peripheral wall section 46F opposite the peripheral wall section 45F that the edge area 69F rests on the peripheral wall sections 46F.

It is however also possible that a gap is provided between the edge area 69F and the inner periphery of the peripheral wall 44F, in particular the peripheral wall 44F. This gap may, for example in the event of an application of force or impact loading SB occurring during a rear impact, represent a deformation space into which the peripheral wall 44F may deform before coming into contact with the reinforcing profile 60F. Due to the impact loading SB it is possible that for example the free end sections 67F, 68F are spread or shifted in the direction of the inner edges, i.e. into the edge areas 49F of the interior 50F. The reinforcing profile 60F therefore forms as it were an active crash element in such an arrangement or configuration.

The reinforcing profile 60F is, relative to the longitudinal axis 43, shorter than the support profile 40F. The reinforcing profile 60F reinforces the cross-member 11F substantially in the centre, namely in the area where, due to the mounting 14F, torsional forces and/or impact forces in the sense of the force application SB occur. Longitudinal ends 61, 62 of the reinforcing profile 60F are therefore recessed relative to the longitudinal end sections 41 of the support profile 40F. It would however easily be possible for the reinforcing profile 60F to extend up to the longitudinal ends 41 of the support profile 40F, in particular up to the side members 12F, 13F.

A support profile 40G of the support assembly 10G is held at its longitudinal end sections 41, in particular its longitudinal ends 42, on the side members 12G, 13G. Provided there, also in a central section of the support profile 40G, is a reinforcing profile 60G, which rests on the support profile 40G and engages at least partly in an interior 50G of the support profile 40G. However, the reinforcing profile 60G does not extend to the longitudinal ends 42 of the support profile 40G, but only up to the cross-member seating 123.

The support profile 40G has a peripheral wall 44G with, in the position of use, narrower upper and lower peripheral wall sections 47G, 48G, between which there extend in the position of use vertically oriented peripheral wall sections 45G, 46G.

Provided on the peripheral wall section 45G is a recess 53G in which the reinforcing profile 60G is accommodated. The recess 53G extends between the longitudinal end sections 41, on which the peripheral wall section 45G has no recess, parallel to the longitudinal axis 43 of the 40G. Formed by this means, in particular by the peripheral wall sections 47G and 48G, are upper and lower tie sections 54G, 55G of the support profile 40G. Also present on the tie sections 54G, 55G is in each case a section 56 of the peripheral wall sections 45G, i.e. from the peripheral wall sections 47G and 48G, section 56 of the peripheral wall 44G protrudes for the purpose of stabilisation or reinforcing section towards the recess 53G and thus in the direction of the reinforcing profile 60G.

The reinforcing profile 60G has a round, here circular, outer periphery. A peripheral wall 64G of the reinforcing profile 60G forms a tubular body.

The reinforcing profile 60G is supported on the support profile 40G at the inner boundaries or inner edges of the recess 53G on the support profile 40G. Advantageous in these areas is also a material bonding connection, for example welding, soldering or the like.

It is also advantageous if the reinforcing profile 60G rests in the interior 50G on the support profile 40G, for example in a contact zone 74G on a wall area of the peripheral wall 44G, in particular the peripheral wall section 46G, opposite the recess 53G. There too it is possible to provide a material bonding and/or form-fitting connection, for example with the aid of spot welding, hole welding, soldering or the like. It is also possible to provide at this point a screw connection, a rivet connection or the like.

Next to the recess 53G are also narrow sections 56G, 57G of the peripheral wall 46G, so that the recess 53G runs between an upper and a lower tie section 54G and 55G of the support profile 40G. The sections 56G, 57G protruding at an angle from the upper wall or the upper peripheral wall section 47G reinforce as it were the upper peripheral wall sections 47G.

Now it is in principle possible that for example in the event of an impact loading SB, the reinforcing profile 60G becomes as it were squeezed or deformed, causing the recess 53G to expand and the hold of the reinforcing profile 60G on the support profile 40G to be weakened. To counteract this problem it is advantageous if an additional holding body is fitted to the support profile 40G, for example a holding body 80. The holding body 80 has a holding section 81 which is fixed to the peripheral wall 44G, for example by means of a screw connection or a material bonding connection. The holding section 81 is for example located on the peripheral wall section 47G. From the holding section 81, a support section 82 extends towards the reinforcing profile 60G. For example the support section 82 is at an angle to the holding section 81. In particular, the holding section 81 and/or the support section 82 are plate-like. The reinforcing profile 60G is held in sandwich fashion between the support section 82 and the peripheral wall section 45G of the support profile 40G.

It is preferred if the holding body 80 is also used to support and/or hold the mounting 14G. So for example a holding body 30G of the mounting 14G may be joined to the holding body 80, for example its support section 82. The holding body 30G is held expediently between the holding body 80 and a further holding body 83, which is similarly fixed to the support profile 40G, for example welded to it.

The concept explained in connection with the support assembly 10G, of a reinforcing profile which is held in a longitudinal recess of the support profile, is also realised for the support assembly 10H.

Basically, a support profile 40H corresponds to the support profile 40G. A peripheral wall 44H of the support profile 40H has, transversely to the longitudinal axis 43, narrower peripheral wall sections 47H, 48H together with wider peripheral wall sections 45H and 46H, which extend between the peripheral wall sections 47H, 48H and are connected to the latter via rounded edge areas 49H. The support profile 40H is therefore flat-rectangular in cross-section, while the higher side is vertically oriented in the position of use.

At the side facing away from the rear end 91 of the vehicle 90, the support profile 40H has a recess 53H in which a reinforcing profile 60H is held. The recess 53H extends between the longitudinal end sections 41 of the support profile 40H. The recess 53H and the reinforcing profile 60H held in it are so long that the reinforcing profile 60H extends into the cross-member seating 23 of the side members 12H, 13H, so that the cross-member 11H is also reinforced by the reinforcing profile 60H in the area of the side members 12H, 13H.

The reinforcing profile 60H has a peripheral wall 64H which has a rectangular cross-section. Side wall sections 65H, 66H of the peripheral wall 64H, which run parallel to the peripheral wall sections 45H, 46H, are narrower transversely to the longitudinal axis 43 than these peripheral wall sections 45H, 46H, whereas side wall sections 67H, 68H running parallel to the peripheral wall sections 47H, 48H are wider than the peripheral wall sections 47H, 48H transversely to the longitudinal axis 43.

The recess 53H is bounded by an upper and a lower tie section 54H, 55H parallel to the longitudinal axis 43, which runs between the longitudinal end sections 41 of the support profile 40H. The recess 53H is located closer to the lower peripheral wall section 48H than to the upper peripheral wall sections 47H. However not only does a part 56H of the peripheral wall section 45H protrude from the upper peripheral wall section 47H towards the recess 53H and therefore to the reinforcing profile 60H, but also a part 57H of the peripheral wall section 45H from the lower peripheral wall section 48H. The reinforcing profile 60H is supported in the recess 53H by the parts 56H, 57H of the peripheral wall section 45H lying opposite one another.

It is also advantageous if the reinforcing profile 60H is supported on the support profile 40H by at least one further section of its peripheral wall 64H. So for example the side wall section 65H is in contact, in particular flat, with the peripheral wall section 46H in the interior 50H, which is bounded by the peripheral wall 44H. There, preferably however also in the area of the recess 53H, a material bonding connection, for example welding, a soldered connection, bonding or the like, between the reinforcing profile 60H and the support profile 40H, is advantageous.

In the support assembly 10I, the cross-member 11I is held on the bracket-like side members 12I, 13I. The cross-member 11I has a support profile 40I which engages in the cross-member holders 123 or is accommodated there. In this area, a screw connection, welding or the like of the support profile 40I is advantageous. The support profile 40I is reinforced by a reinforcing profile 60I, which passes through the support profile 40I substantially over its entire axial length, but does not reach the longitudinal ends 42. However, the reinforcing profile 60I is also so long that it extends to the support zone or the cross-member seating locations 123 of the side members 12I, 13I and can act for the purpose of reinforcement.

The reinforcing profile 60I is held in a recess 53I of the support profile 40I. The recess 53I includes in each case an opening 153, 154 on opposite peripheral wall sections 45I and 46I, running vertically in the position of use, of the support profile 40I. This has namely a tubular body shape in cross-section, in which the peripheral wall sections 45I, 46I are joined together by upper and lower peripheral wall sections 47I and 48I. Preferably rounded edge areas 49I may be provided between the aforementioned peripheral wall sections.

The reinforcing profile 60I also has a substantially rectangular shape, wherein however its peripheral wall 64I has side wall sections 65I, 66I running substantially vertically in the position of use, together with upper and lower side wall sections 67I, 68I running substantially horizontally in the position of use, and extending between the side wall sections 65I, 66I.

The mounting 14I is held on the cross-member 11I with the aid of a connecting pin 38, in particular a threaded bolt. The connecting pin 38 penetrates the cross-member 11 from the wall, upper in the position of use, of the support profile 40I, namely from the peripheral wall section 47I and is screwed to a base body of the mounting 14I, as is evident in FIG. 29. For support within the inside nested profiles of the cross-member 11I, i.e. the support profile 40I and the reinforcing profile 60I, a support sleeve 39 extends into the corresponding recesses of the support profile 40I and the reinforcing profile 60I between the inside of the lower peripheral wall section 48I facing the interior 50I and the free upper side, i.e. the side facing away from the interior 50I, of the upper peripheral wall section 47I. Through the support sleeve 39 there passes the connecting pin 38, so that the latter rests with its head 38I not directly on the peripheral wall 44I, but instead on the support sleeve 39. This counteracts any squeezing or other deformation of the support profile 40I on screwing-in of the support sleeve 39. Of course it would also be possible for the head 38I to rest directly on the peripheral wall 44I. Also possible would be the arrangement of the end face or the free end of the support sleeve 39 directly beneath the peripheral wall 44I, as it were supporting the latter from below.

The reinforcing profile 60I is held between upper and lower tie sections 54I, 55I of the support profile 40I, which extend between the longitudinal ends 42 of the support profile 40 and bound the recess 53I above and below in the position of use.

From the upper and lower peripheral wall sections 47I, 48I, sections 56I and 57I of the peripheral wall sections 45I, 46I protrude at an angle in the direction of the recess 53I, so that the corresponding tie sections 54I, 55I are resistant to bending and resilient.

Certainly the connecting pin 38 already provides for a stable connection between the 40I and the reinforcing profile 60I. Additional form-fitting and/or material bonding connections are however advantageous, so e.g. at the edge area or boundary area of the recess 53I, where a weld seam, soldered connection, adhesive bond or the like may be provided between the support profile 40I and the reinforcing profile 60I.

The support profile 40I and the reinforcing profile 60I have a flat-rectangular cross-section. The longer side walls or peripheral walls of the support profile 40I are however aligned substantially vertically, while in the reinforcing profile 60I they are oriented substantially horizontally. Now, a horizontal alignment of the reinforcing profile 60I such that the side wall sections 67I and 68I run parallel to the peripheral sections 47I and 48I would in principle be possible. Here however the side wall sections 67I and 68I run at an angle to the peripheral sections 47I and 48I, namely for example around an angle WI relative to a plane PE parallel to the peripheral wall sections 47I and 48I.

Also recognised is a basically cross-shaped arrangement of support profile 40I and reinforcing profile 60I, in which opposite side walls of the reinforcing profile 60I, namely the side wall sections 65I, 66I protrude from the outer periphery of the support profile 40I.

In the support assembly 10J, the cross-member 11J has a support profile 40J with a flat-rectangular cross-sectional contour transversely to its longitudinal axis 43.

A peripheral wall 44J of the support profile 40J has narrower peripheral wall sections 47J, 48J, upper and lower in the position of use, which are joined to wider peripheral wall sections 45J and 46J, for example vertical or extending substantially vertically in the position of use.

Edge areas 49J, which are preferably rounded, are provided between the peripheral wall sections 45J-48J.

The support profile 40J is supported on the side members 12J, 13J, not only at the transverse centre but also reinforced by a reinforcing profile 60J in the area of the side members 12J, 13J.

The reinforcing profile is preferably reinforcing for the wider peripheral wall sections 45J and 46J. For example the reinforcing profile 60J is connected to the peripheral wall sections 45J and 46J.

The reinforcing profile 60J has a base leg 66J, from which protrude side legs 67J and 68J, for example roughly at a right-angle, resulting in an altogether U-shaped cross-sectional contour. The side legs 67J, 68J run axially next to the peripheral wall sections 47J, 48J of the support profile 40J, preferably parallel to them, while angled inclinations are readily possible. In this case, the side legs 67J, 68J could be as it were V-shaped in orientation, or also run towards one another at their free end sections.

The free end sections of the side legs 67J, 68J form plug-in projections 65J. The plug-in projections 65J engage in plug-in locations 59J which are provided on the peripheral wall 44J of the support profile 40J, here on the peripheral wall section 45J.

The side legs 67J, 68J also have push-through openings 53J on the peripheral wall 44J, which are here located on the peripheral wall section 46J opposite the peripheral wall section 45J. Consequently the reinforcing profile 60J is inserted in the support profile 40J as it were in the manner of a clip or holding clip and acts for the purpose of a reinforcement.

Provided between the base leg 66J and the side legs 67J, 68J are edge areas, preferably curved edge areas 69J.

Since parts of the peripheral wall sections 45J and 46J protrude at an angle from the peripheral wall sections 47J, 48J towards the reinforcing profile 60J, upper and lower tie sections 54J, 55J of the support profile 40J are thereby formed.

In principle it would be possible for the clip-like reinforcing profile 60J to engage even further into the support profile 40J, so that for example the base leg or the side wall section 66J is supported, in particular flatly on the peripheral wall section 46J. There a material bonding connection, for example bonding, soldering or the like may advantageously be provided.

It is advantageous if, in the area of the push-through openings 53J and/or the plug-in locations 59J, a material bonding connection is similarly provided between the support profile 40J and the 60J, for example a soldered connection, welding or the like.

A form-fitting hold would also be possible, to the effect that for example sections of the plug-in projections 65J protruding in front of the plug-in locations 59J are angled or bent so that they are for example at an angle to the side wall sections 67J. 68J and therefore at least inhibit, preferably prevent, release of the reinforcing profile 60J from the support profile 40J. The plug-in projections 65J may also be pressed or impressed into the plug-in locations 59J e.g. with the aid of a pressing tool or impressing tool.

In the support assembly 10K, a support profile 40K which forms the cross-member 11K, also has a reinforcement, namely by means of a reinforcing profile 60K. The reinforcing profile 60K is U-shaped in cross-section and has a base leg 66K from which side legs 67K, 68K extend at an angle, preferably a right-angle.

The support profile 40K has a rectangular, here even square, cross-section with peripheral wall sections 45K, 46K lying opposite one another and running roughly vertical in the position of use, together with peripheral wall sections 47K, 48K similarly opposite one another and connecting the aforementioned peripheral wall sections with one another, altogether enclosing an interior 50K.

The reinforcing profile 60K engages the interior 50K with its side legs 67K, 68K, which are inserted through passage openings 53K for example on the peripheral wall section 46K and rest with their free end sections partly on the inside of the peripheral wall section 45K facing the interior 50K, but also in part penetrating with plug-in projections 65K in corresponding plug-in locations 59K on the peripheral wall section 45K. There, a material bonding connection may be provided, but also a form-fitting connection such that the free end sections of the plug-in projections 65K are pressed or impressed into the corresponding plug-in locations 59K or sections of the plug-in projections 65K protruding from the plug-in location 59K are angled or bent over.

It is advantageous if the base leg 66K is supported flat on the peripheral wall section 46K, while at this point an additional material bonding connection, for example welding or the like, is also advantageous. Altogether, therefore, the reinforcing profile 60K rests on the support profile 40K both in the area of the base leg 66K and also in the area of the free end sections of the side legs 67K, 68K, resulting in a high level of rigidity.

Provided in support assembly 10L as cross-member 11L is a support profile 40L which is reinforced by a T-shaped reinforcing profile 60. As compared with previous embodiments, here there is a saving in material in the reinforcing profile 60, nevertheless a high quality reinforcement is possible.

The support profile 40L has peripheral wall sections 45L, 46L lying opposite one another and running substantially vertically in the position of use, together with peripheral wall sections 47L, 48L connecting the former, and narrower than these peripheral sections 45L, 46L. This results in a narrow-rectangular cross-sectional profile of the support profile 40L.

The reinforcing profile 60L has a base leg 66L, from which a side leg 67L protrudes roughly in the centre, resulting in an altogether T-shaped cross-sectional contour.

The base leg 66L fits expediently flat on the peripheral wall section 46L, while its side leg 46L penetrates a passage opening 53L on the peripheral wall section 46L, thus penetrating into the interior 50L of the support profile 40L.

There the side leg 67L is supported partly on the peripheral wall 44L, namely on the peripheral wall section 45L, and partly penetrates with projections 65L, namely plug-in projections, into corresponding plug-in locations 59L on the peripheral wall section 45L.

The plug-in projections 65L are in a row arrangement, side by side and running parallel to the longitudinal axis 43 of the support profile 40 next to one another. Therefore the side leg 67L and with it also the reinforcing profile 60L, are on the one hand fixed with form-fitting, namely with the aid of the plug-in projections 65L, and on the other hand supported along the longitudinal axis 43 at several positions on the support profile 40L. The result is a very stable and load-bearing structure.

It is advantageous if contact zones of the reinforcing profile 60L with the support profile 40L are designed for a material bonding connection, i.e. for example a soldered connection, adhesive bond, welded joint or the like is provided between the base leg 66L and the peripheral wall section 46L. It is of course also advantageous in the area of the free end section of the side leg 67L, where this is in contact with the peripheral wall section 45L. In addition the plug-in projections 65L, like the plug-in projections 65J or 65K, may be held with form-fitting in the assigned plug-in locations 65L, for example by pressing or impressing, overturning of the section protruding from the plug-in locations 65L, or the like.

The cross-member 11M of the support assembly 10M has a curved, arch-like course. It extends in an arched shape around the rear end 91, transversely to the vehicle longitudinal axis 95 of the vehicle 92. A support profile 40M of the cross-member 11M has a corresponding curved course, whereas a reinforcing profile 60M reinforcing the support profile 40M has at least one straight wall, namely a base wall or a base leg 66M. The reinforcing profile 60M extends between the side members 12M, 13M, but not as far as them. It reinforces in particular a central reinforcing section 51 of the cross-member 11M. There would however be no problem in also providing the reinforcing profile 60M as far as the side members 12M, 13M.

Protruding from the base leg 66M is a side leg 67M which engages in an interior 50M of the support profile 40M. The base leg 66M and the side leg 67M form for example a configuration or shape which is L-shaped in cross-section. The reinforcing profile 60M is lighter than a T-shaped or U-shaped version of the reinforcing profile.

The interior 50M of the support profile 40M is bounded by wider peripheral wall sections 45M, 46M, running vertically in the position of use, of a peripheral wall 44M, together with narrower peripheral wall sections 47M, 48M, running horizontally in the position of use and joining the peripheral wall sections 45M, 46M to one another. Provided between the aforementioned peripheral wall sections 45M-48M are edge areas 49M, which are angular or curved. The support profile 40M therefore has a flat rectangular shape and is upright.

A passage opening or push-through opening 53M on the peripheral wall section 46M passes through the side leg 67M which penetrates, with plug-in projections 65M, plug-in locations 59M on the peripheral wall section 45M. A material bonding connection may be provided there, but also a form-fitting connection.

A free end face of the plug-in projections 65M may have a curved contour following the arch-shaped course of the peripheral wall 44M in the area of the peripheral wall section 45M, see FIG. 44, or also run parallel to the base leg 66M.

The base leg 66M has, differing from the curved peripheral wall section 46M, a straight course, so that for example in the area of the mounting 14M it is closer to the peripheral wall 44M, for example resting on it, while being at a greater distance from the peripheral wall 44M towards the longitudinal ends 42 of the cross-member 11 or the support profile 40M. Close to the mounting 14M a form-fitting and/or material bonding connection may be provided between the base leg 66M and the peripheral wall section 46M, for example bonding, welding or the like. Suitable for a form-fitting connection for example is an arrangement with at least one rivet and/or a screw connection, interlocking forming or the like.

The support assembly 10N has a curved cross-member 11N with a support profile 40N extending between side members 12N, 13N, but reinforced by a reinforcing profile 60N only in a central section and not up to the side members 12N, 13N, although this would easily be possible.

The support profile 40N has peripheral wall sections 45N, 46N, running roughly vertically in the position of use, of a peripheral wall 44N, and between which there extend peripheral wall sections 47N, 48N which for example run roughly horizontally in the position of use. This alignment is however to be understood as only by way of example, and there would be no problem in providing a different alignment. This also applies to the typical embodiments described above. At any rate, the support profile 40N has a rectangular cross-section.

Engaging in an interior 50N bounded by the peripheral wall 44N are side legs 67N, 68N of the reinforcing profile 60N which protrude from a base leg 66N of the reinforcing profile 60N. Provided at the free end sections of the side legs 67N, 68N are plug-in projections 65N which engage in plug-in locations 59N on the peripheral wall section 45N. Between the plug-in projections 65N, the side legs 67N, 68N rest on the side of the peripheral wall section 45N facing the interior 50N. In contrast to the peripheral wall section 46N, the base leg 66N of the reinforcing profile 60N runs straight, i.e. the base leg 66N has different clearances along the curved path to the peripheral wall section 46N.

A load carrier 300 shown in FIG. 51 has a support frame 310 which has support profiles 340 reinforced by reinforcing profiles 360. The support profiles 340 form longitudinal members 311 of the support frame 310 which are joined together by a cross-member 312 and a further transverse connector or cross-member 313 at their respective longitudinal end sections. The cross-member 312 and the longitudinal members 311 form a U-shaped configuration which is suitable for the placing of a load, for example for the mounting of cycles.

Provided on the longitudinal members 311 are support elements 382, for example cycle grooves, for the placing of wheels of cycles. The support elements 382 may be moved between the position of use shown in the drawing, in which they protrude from the longitudinal members 311, into an inoperative position in which they are located between the longitudinal members 311, for example swivelled in between them.

Also fitted to the cross-connector 313 are lamps 381, preferably mounted pivotably, so that they too are adjustable between a position of use shown in the drawing and an inoperative position or packed position moved closer to the longitudinal members 311.

Also protruding from the support frame 310 is a carrying bracket or support bracket 383, to which the cycles stowed on the support frame 310 may be fastened, for example with the aid of a holder 384.

The support profiles 340 are hollow profiles or tubular bodies, with reinforcing profiles 360 mounted in their interiors, for example also tubular bodies. An outer peripheral contour of the reinforcing profiles 360 corresponds at least partly to an inner peripheral contour of the peripheral walls of the support profiles 340, so that the profiles 340, 360 are able to rest on one another.

Such reinforcement could also be provided with no difficulty by a reinforcing profile on the cross-member 312, to which is fitted for example a coupling device connecting pin 380 for attaching to a trailer coupling, for example one of the trailer couplings 15A-15N. The cross-member 312 is also heavily loaded during vehicle operation. Therefore, for example a reinforcing profile in the manner of the reinforcing profile 60A may be located on the outer periphery of the cross-member 312.

The invention claimed is:

1. A support assembly for a rear end of a vehicle, wherein the support assembly forms a component of a load carrier, releasably attachable to the vehicle or forms a component of a coupling device mounted on or attachable to a rear end of a body of the vehicle, wherein the support assembly, in the case of the load carrier, is provided for the placing of a load, and in the case of the coupling device has a mounting for a trailer coupling for attaching a trailer to the vehicle or for a load carrier coupling part for releasable coupling of a load carrier to the vehicle, wherein the support assembly has at least one support profile which has a support profile peripheral wall with support profile peripheral wall sections at an angle to one another and/or running in a curve around the longitudinal axis of the support profile or profiles and bounding on the periphery an interior of the support profile or profiles with respect to the longitudinal axis, wherein the support profile or profiles is or are reinforced by at least one reinforcing profile, which comprises reinforcing profile wall sections running at an angle to one another and/or curved around a reinforcing profile longitudinal axis of the reinforcing profile, and resting on the support profile peripheral wall of the support profile or profiles to reinforce the support profile or profiles, wherein the reinforcing profile or profiles engages or engage in the interior of the support profile or profiles or the support profile or profiles engages or engage in a reinforcing profile interior of the reinforcing profile or profiles which is bounded by the reinforcing profile wall sections in a peripheral angle range of more than 180° extending around the longitudinal axis of the support profile or profiles, wherein the reinforcing profile does not protrude from an upper side and/or not from a bottom side of the support profile in the position of use.

2. The support assembly according to claim 1, wherein the peripheral walls of the support profile and/or the reinforcing profile wall sections of the reinforcing profile are completely closed around the longitudinal axis and/or annularly, and/or form an annular closed peripheral wall around the longitudinal axis of the support profile or the reinforcing profile.

3. The support assembly according to claim 1, wherein the reinforcing profile is held captive to the support profile with the aid of direct and screwless connection with the support profile and the support of the reinforcing profile on the support profile.

4. The support assembly according to claim 1, wherein the reinforcing profile and/or the support profile have polygonal cross-section.

5. The support assembly according to claim 1, wherein at least one reinforcing profile wall section lies flat against the peripheral wall of the support profile.

6. The support assembly according to claim 1, wherein the reinforcing profile is held completely in the interior of the support profile and does not extend beyond the peripheral wall of the support profile.

7. The support assembly according to claim 1, wherein the reinforcing profile protrudes from an outer peripheral contour of the support profile on at least one side.

8. The support assembly according to claim 1, wherein, in the case of a component of the support profile or the reinforcing profile there is a recess in which the other component of the support profile or reinforcing profile engages.

9. The support assembly according to claim 1, wherein, the reinforcing profile extends parallel or substantially parallel to the longitudinal axis of the support profile next to at least one tie section of the support profile, wherein the tie section or tie sections has or have at least two support profile peripheral wall sections arranged transversely to the longitudinal axis, at an angle to one another and/or curved.

10. The support assembly according to claim 1, wherein the reinforcing profile has a base leg and at least one side leg sticking out from the base leg and/or that the reinforcing profile has a C-shaped, U-shaped, V-shaped, E-shaped, W-shaped, T-shaped or L-shaped cross-section.

11. The support assembly according to claim 1, wherein a base leg of the reinforcing profile or reinforcing profiles is arranged outside the interior of the support profile, and at least one leg of the reinforcing profile extending away from the base leg, engages or engage in the interior of the support profile.

12. The support assembly according to claim 11, wherein the base leg of the reinforcing profile or reinforcing profiles rests on the peripheral wall of the support profile and/or is joined to the peripheral wall of the support profile by material bonding and/or form-fitting.

13. The support assembly according to claim 1, wherein in the position of use of the support assembly, a vertical extent in height of the support profile transversely to its longitudinal axis is greater than a vertical extent of the reinforcing profile and/or a distance between upper and lower support profile peripheral wall sections of the support profile is greater than a distance between upper and lower reinforcing profile walls.

14. The support assembly according to claim 1, wherein in the position of use of the support assembly, a horizontal extent in depth of the support profile transversely to its longitudinal axis is less than a horizontal extent in depth of the reinforcing profile and/or a distance between support profile peripheral wall sections of the support profile which are horizontally furthest removed from one another is less than a distance between reinforcing profile walls horizontally furthest removed from one another.

15. The support assembly according to claim 1, wherein at least one longitudinal end of the support profile are not reinforced by the reinforcing profile and/or that the support profile is reinforced by the reinforcing profile over substantially its entire length.

16. The support assembly according to claim 1, wherein the support profile is reinforced by the reinforcing profile in the area of its connection with a further component of the support assembly for connection with the vehicle and/or the mounting for the trailer coupling or the load carrier coupling part and/or another profile.

17. The support assembly according to claim 1, wherein the support profile and the reinforcing profile are made of the same material or of different materials, and/or that the support profile and/or the reinforcing profile are or is made of metal.

18. The support assembly according claim 1, wherein the reinforcing profile is joined to the support profile by form-fitting and/or force-fitting and/or by material bonding.

19. The support assembly according to claim 1, wherein the reinforcing profile or the support profile has at least one recess running transversely to the longitudinal axis, in which there engages a holding projection, of the respective other profile, the support profile or the reinforcing profile.

20. The support assembly according to claim 1, wherein the reinforcing profile and the support profile are form-fitted to one another with the aid of forming of at least one of the profiles which is carried out with the profiles fitted together.

21. The support assembly according to claim 1, wherein the reinforcing profile is joined to the support profile with the aid of internal high-pressure forming and/or curvature deformation in which the profiles fitted together are deformed together, so that the profiles have a curved shape or in each case two legs at an angle to one another.

22. The support assembly according to claim 1, wherein at least one space between the reinforcing profile and the support profile and/or at least one interior space of the reinforcing profile or the support profile is filled with a foam material and/or elastic material.

23. The support assembly according to claim 1, wherein the support profile and the reinforcing profile are held together with the aid of at least one holding body separate from the support profile and the reinforcing profile.

24. The support assembly according to claim 23, wherein the holding body is connected to the mounting for the trailer coupling or the load carrier coupling part, or is formed by the mounting and/or that the holding body at least partly encases the arrangement of support profile and reinforcing profile or may form a housing and/or that the holding body comprises a clip, which clamps together at least one of the support profile—or the reinforcing profile.

25. The support assembly according to claim 1, wherein the support profile and the reinforcing profile are positively joined to one another by at least one pair of a plug-in location and a plug-in projection, wherein the plug-in projection engages in the plug-in location or locations.

26. The support assembly according to claim 25, wherein the plug-in projection fitted in the plug-in location is joined by material bonding to the support profile.

27. The support assembly according to claim 25, wherein the reinforcing profile rests on the support profile next to the plug-in projection.

28. The support assembly according to claim 1, wherein the reinforcing profile or the support profile have a row arrangement in an array line of plug-in projections arranged side-by-side, which engage in an elongated plug-in location running along the array line or in plug-in locations provided in a row arrangement along the array line, wherein the plug-in location or plug-in locations are provided on the respective other of reinforcing profile and support profile.

29. The support assembly according to claim 28, wherein the reinforcing profile rests on the support profile between the plug-in projections.

30. The support assembly according to claim 1, wherein at least one end face of the reinforcing profile has, relative to the longitudinal axis of the support profile, an inclined course and/or a curvature to reduce notch stress between the support profile and the reinforcing profile.

31. The support assembly according to claim 1, wherein the reinforcing profile and the support profile in at least one area are at a distance from one another in which deformation of the reinforcing profile and/or the support profile is reduced under impact loading and/or that the reinforcing profile is supported on the support profile by wedging, in the event of an impact loading.

32. The support assembly according to claim 1, wherein it has a cross-member, extending in the position of use transversely to a vehicle longitudinal axis of the vehicle, which has longitudinal end sections held on side members of the support assembly provided for connection to the vehicle.

33. The support assembly according to claim 32, wherein the cross-member and/or the side members have or are formed by the support profile reinforced by the reinforcing profile.

34. The support assembly according to claim 32, wherein the reinforcing profile is connected to the support profile in at least one connection zone of the cross-member by one of the side members or both side members.

35. The support assembly according to claim 1, wherein the reinforcing profile is a separate component from a component provided for connection of the support profile to another component and/or another profile of the support assembly.

36. The support assembly according to claim 1, wherein the support profile and/or the reinforcing profile are designed as single-piece bodies and/or that the support profile peripheral wall and/or the reinforcing profile wall sections are in each case in one piece and/or made from a single blank.

37. The support assembly according to claim 1, wherein the support profile and/or the reinforcing profile have an elongated shape, wherein their length relative to the respective longitudinal axis is at least twice as large as their diameter.

38. The support assembly according to claim 1, wherein the reinforcing profile is fitted to a side of the support profile facing away from the rear end, when the support profile is mounted on the vehicle.

39. The support assembly according to claim 1, wherein a base wall or a base leg of the reinforcing profile run vertically or substantially vertically in the position of use.

40. The support assembly according to claim 1, wherein the reinforcing profile is not provided or arranged for the connection of two part sections at an angle to one another and/or not provided or arranged for connecting a cross-member to a side member of the support assembly.

41. The support assembly according to claim 1, wherein the support profile protrudes from opposite longitudinal ends of the reinforcing profile.

42. The support assembly according to claim 1, wherein the reinforcing profile is used solely for reinforcing the support profile and/or is not used for connecting the support profile to another component.

43. A support assembly for a rear end of a vehicle, wherein the support assembly forms a component of a load carrier, releasably attachable to the vehicle or forms a component of a coupling device mounted on or attachable to a rear end of a body of the vehicle, wherein the support assembly, in the case of the load carrier, is provided for the placing of a load, and in the case of the coupling device has a mounting for a trailer coupling for attaching a trailer to the vehicle or for a load carrier coupling part for releasable coupling of a load carrier to the vehicle, wherein the support assembly has at least one support profile which has a support profile peripheral wall with support profile peripheral wall sections at an angle to one another and/or running in a curve around the longitudinal axis of the support profile or profiles and bounding on the periphery an interior of the support profile or profiles with respect to the longitudinal axis, wherein the support profile or profiles is or are reinforced by at least one reinforcing profile, which comprises reinforcing profile wall sections running at an angle to one another and/or curved around a reinforcing profile longitudinal axis of the reinforcing profile, and resting on the support profile peripheral wall of the support profile or profiles to reinforce the support profile or profiles, wherein the reinforcing profile or profiles engages or engage in the interior of the support profile or profiles or the support profile or profiles engages or engage in a reinforcing profile interior of the reinforcing profile or profiles which is bounded by the reinforcing profile wall sections in a peripheral angle range of more than 180° extending around the longitudinal axis of the support profile or profiles, wherein the reinforcing profile is held captive to the support profile with the aid of direct and screwless connection with the support profile and the support of the reinforcing profile on the support profile.

44. A support assembly for a rear end of a vehicle, wherein the support assembly forms a component of a load carrier, releasably attachable to the vehicle or forms a component of a coupling device mounted on or attachable to a rear end of a body of the vehicle, wherein the support assembly, in the case of the load carrier, is provided for the placing of a load, and in the case of the coupling device has a mounting for a trailer coupling for attaching a trailer to the vehicle or for a load carrier coupling part for releasable coupling of a load carrier to the vehicle, wherein the support assembly has at least one support profile which has a support profile peripheral wall with support profile peripheral wall sections at an angle to one another and/or running in a curve around the longitudinal axis of the support profile or profiles and bounding on the periphery an interior of the support profile or profiles with respect to the longitudinal axis, wherein the support profile or profiles is or are reinforced by at least one reinforcing profile, which comprises reinforcing profile wall sections running at an angle to one another and/or curved around a reinforcing profile longitudinal axis of the reinforcing profile, and resting on the support profile peripheral wall of the support profile or profiles to reinforce the support profile or profiles, wherein the reinforcing profile or profiles engages or engage in the interior of the support profile or profiles or the support profile or profiles engages or engage in a reinforcing profile interior of the reinforcing profile or profiles which is bounded by the reinforcing profile wall sections in a peripheral angle range of more than 180° extending around the longitudinal axis of the support profile or profiles, wherein the reinforcing profile is held completely in the interior of the support profile and does not extend beyond the peripheral wall of the support profile.

45. A support assembly for a rear end of a vehicle, wherein the support assembly forms a component of a load carrier, releasably attachable to the vehicle or forms a component of a coupling device mounted on or attachable to a rear end of a body of the vehicle, wherein the support assembly, in the case of the load carrier, is provided for the placing of a load, and in the case of the coupling device has a mounting for a trailer coupling for attaching a trailer to the vehicle or for a load carrier coupling part for releasable coupling of a load carrier to the vehicle, wherein the support assembly has at least one support profile which has a support profile peripheral wall with support profile peripheral wall sections at an angle to one another and/or running in a curve around the longitudinal axis of the support profile or profiles and bounding on the periphery an interior of the support profile or profiles with respect to the longitudinal axis, wherein the support profile or profiles is or are reinforced by at least one reinforcing profile, which comprises reinforcing profile wall sections running at an angle to one another and/or curved around a reinforcing profile longitudinal axis of the reinforcing profile, and resting on the support profile peripheral wall of the support profile or profiles to reinforce the support profile or profiles, wherein the reinforcing profile or profiles engages or engage in the interior of the support profile or profiles or the support profile or profiles engages or engage in a reinforcing profile interior of the reinforcing profile or profiles which is bounded by the reinforcing profile wall sections in a peripheral angle range of more than 180° extending around the longitudinal axis of the support profile or profiles, wherein in the position of use of the support assembly, a vertical extent in height of the support profile transversely to its longitudinal axis is greater than a vertical extent of the reinforcing profile and/or a distance between upper and lower support profile peripheral wall sections of the support profile is greater than a distance between upper and lower reinforcing profile walls.

46. A support assembly for a rear end of a vehicle, wherein the support assembly forms a component of a load carrier, releasably attachable to the vehicle or forms a component of a coupling device mounted on or attachable to a rear end of a body of the vehicle, wherein the support assembly, in the case of the load carrier, is provided for the placing of a load, and in the case of the coupling device has a mounting for a trailer coupling for attaching a trailer to the vehicle or for a load carrier coupling part for releasable coupling of a load carrier to the vehicle, wherein the support assembly has at least one support profile which has a support profile peripheral wall with support profile peripheral wall sections at an angle to one another and/or running in a curve around the longitudinal axis of the support profile or profiles and bounding on the periphery an interior of the support profile or profiles with respect to the longitudinal axis, wherein the support profile or profiles is or are reinforced by at least one reinforcing profile, which comprises reinforcing profile wall sections running at an angle to one another and/or curved around a reinforcing profile longitudinal axis of the reinforcing profile, and resting on the support profile peripheral wall of the support profile or profiles to reinforce the support profile or profiles, wherein the reinforcing profile or profiles engages or engage in the interior of the support profile or profiles or the support profile or profiles engages or engage in a reinforcing profile interior of the reinforcing profile or profiles which is bounded by the reinforcing profile wall sections in a peripheral angle range of more than 180° extending around the longitudinal axis of the support profile or profiles, wherein at least one space between the reinforcing profile and the support profile and/or at least one interior space of the reinforcing profile or the support profile is filled with a foam material and/or elastic material.

* * * * *